(12) United States Patent
Roo

(10) Patent No.: US 7,466,971 B1
(45) Date of Patent: Dec. 16, 2008

(54) ACTIVE RESISTIVE SUMMER FOR A TRANSFORMER HYBRID

(75) Inventor: Pierte Roo, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 359 days.

(21) Appl. No.: 10/786,010

(22) Filed: Feb. 26, 2004

Related U.S. Application Data

(63) Continuation of application No. 09/629,092, filed on Jul. 31, 2000, now Pat. No. 6,775,529.

(51) Int. Cl.
*H04B 1/10* (2006.01)
*H04B 3/20* (2006.01)
*H04B 1/38* (2006.01)

(52) U.S. Cl. .................. 455/296; 455/295; 455/278.1; 455/63.1; 455/67.13

(58) Field of Classification Search ................. 455/301, 455/295, 296, 278.1, 63.1, 67.13
See application file for complete search history.

(56) References Cited

U.S. PATENT DOCUMENTS

| | | | |
|---|---|---|---|
| 3,297,951 A | 1/1967 | Blasbalg | |
| 3,500,215 A | 3/1970 | Leuthold et al. | |
| 3,521,170 A | 7/1970 | Leuthold et al. | |
| 3,543,009 A | 11/1970 | Voelcher, Jr. | |
| 3,793,589 A | 2/1974 | Puckette | |
| 3,973,089 A | 8/1976 | Puckette | |
| 4,071,842 A | 1/1978 | Tewksbury | |
| 4,112,253 A | 9/1978 | Wilhelm | |
| 4,131,767 A | 12/1978 | Weinstein | |
| 4,152,541 A | 5/1979 | Yuen | |
| RE30,111 E | 10/1979 | Blood, Jr. | |
| 4,309,673 A | 1/1982 | Norberg et al. | |
| 4,321,753 A | 3/1982 | Fusari | |
| 4,362,909 A | 12/1982 | Snijders et al. | |
| 4,393,370 A | 7/1983 | Hareyama | |
| 4,393,494 A | 7/1983 | Belforte et al. | |
| 4,408,190 A | 10/1983 | Nagano | |
| 4,464,545 A | 8/1984 | Werner | |
| 4,503,421 A | 3/1985 | Harayama | |
| 4,527,126 A | 7/1985 | Petrich et al. | |
| 4,535,206 A | 8/1985 | Falconer | |
| 4,591,832 A | 5/1986 | Fling et al. | |
| 4,605,826 A | 8/1986 | Kanemasa | |
| 4,621,172 A | 11/1986 | Kanemasa et al. | |
| 4,621,356 A | 11/1986 | Scipione | |

(Continued)

FOREIGN PATENT DOCUMENTS

DE   10 2004 017 497   11/2004

(Continued)

OTHER PUBLICATIONS

U.S. Appl. No. 09/920,241, filed Aug. 1, 2001, Roo.

(Continued)

*Primary Examiner*—Matthew Anderson
*Assistant Examiner*—Eugene Yun

(57) ABSTRACT

An electrical circuit in a communications channel is provided. The electrical circuit includes an active resistive summer. The active resistive summer has a composite signal as an input. The composite signal includes a transmission signal component and a receive signal component. A replica transmission signal is also an input to the active resistive summer. The active resistive summer includes the receive signal component as an output.

42 Claims, 5 Drawing Sheets

U.S. PATENT DOCUMENTS

| | | |
|---|---|---|
| 4,626,803 A | 12/1986 | Holm |
| 4,715,064 A | 12/1987 | Claessen |
| 4,727,566 A | 2/1988 | Dahlqvist |
| 4,746,903 A | 5/1988 | Czarniak et al. |
| 4,816,830 A | 3/1989 | Cooper |
| 4,817,081 A | 3/1989 | Wouda et al. |
| 4,868,571 A | 9/1989 | Inamasu |
| 4,878,244 A | 10/1989 | Gawargy |
| 4,888,762 A | 12/1989 | Arai |
| 4,894,820 A | 1/1990 | Miyamoto |
| 4,935,919 A | 6/1990 | Hiraguchi |
| 4,947,171 A | 8/1990 | Pfiefer et al. |
| 4,970,715 A | 11/1990 | McMahan |
| 4,972,360 A | 11/1990 | Cukier et al. |
| 4,988,960 A | 1/1991 | Tomisawa |
| 4,993,045 A | 2/1991 | Alfonso |
| 4,999,830 A | 3/1991 | Agazzi |
| 5,018,134 A | 5/1991 | Kokubo et al. |
| 5,043,730 A | 8/1991 | Obinnata |
| 5,084,865 A | 1/1992 | Koike |
| 5,119,365 A | 6/1992 | Warner et al. |
| 5,136,260 A | 8/1992 | Yousefi-Elezei |
| 5,148,427 A | 9/1992 | Buttle et al. |
| 5,153,450 A | 10/1992 | Ruetz |
| 5,164,725 A | 11/1992 | Long |
| 5,175,764 A * | 12/1992 | Patel et al. .................. 379/412 |
| 5,185,538 A | 2/1993 | Kondoh et al. |
| 5,202,528 A | 4/1993 | Iwaooji |
| 5,204,880 A | 4/1993 | Wurster et al. |
| 5,212,659 A | 5/1993 | Scott et al. |
| 5,222,084 A | 6/1993 | Takahashi |
| 5,243,346 A | 9/1993 | Inami |
| 5,243,347 A | 9/1993 | Jackson et al. |
| 5,245,231 A | 9/1993 | Kocis et al. |
| 5,245,654 A | 9/1993 | Wilkison et al. |
| 5,248,956 A | 9/1993 | Himes |
| 5,253,249 A | 10/1993 | Fitzgerald et al. |
| 5,253,272 A | 10/1993 | Jaeger et al. |
| 5,254,994 A | 10/1993 | Takakura et al. |
| 5,267,269 A | 11/1993 | Shih et al. |
| 5,269,313 A | 12/1993 | DiPinto |
| 5,272,453 A | 12/1993 | Traynor et al. |
| 5,280,526 A | 1/1994 | Laturell |
| 5,282,157 A | 1/1994 | Murphy et al. |
| 5,283,582 A | 2/1994 | Krenik |
| 5,305,379 A | 4/1994 | Takeuchi |
| 5,307,064 A | 4/1994 | Kudoh |
| 5,307,405 A | 4/1994 | Sih |
| 5,323,157 A | 6/1994 | Ledzius et al. |
| 5,325,400 A | 6/1994 | Co et al. |
| 5,357,145 A | 10/1994 | Segaram |
| 5,365,935 A | 11/1994 | Righter et al. |
| 5,367,540 A | 11/1994 | Kakushi et al. |
| 5,375,147 A | 12/1994 | Awata et al. |
| 5,388,092 A | 2/1995 | Koyama et al. |
| 5,388,123 A | 2/1995 | Uesugi et al. |
| 5,392,042 A | 2/1995 | Pellon |
| 5,399,996 A | 3/1995 | Yates et al. |
| 5,418,478 A | 5/1995 | Van Brunt et al. |
| 5,440,514 A | 8/1995 | Flannagan et al. |
| 5,440,515 A | 8/1995 | Chang et al. |
| 5,444,739 A | 8/1995 | Uesegi et al. |
| 5,465,272 A | 11/1995 | Smith |
| 5,471,665 A | 11/1995 | Pace et al. |
| 5,479,124 A | 12/1995 | Pun et al. |
| 5,489,873 A | 2/1996 | Kamata et al. |
| 5,507,036 A | 4/1996 | Vagher |
| 5,508,656 A | 4/1996 | Jaffard et al. |
| 5,517,141 A | 5/1996 | Abdi et al. |
| 5,517,435 A | 5/1996 | Sugiyama |
| 5,521,540 A | 5/1996 | Marbot |
| 5,537,113 A | 7/1996 | Kawabata |
| 5,539,403 A | 7/1996 | Tani et al. |
| 5,539,405 A | 7/1996 | Norsworthy |
| 5,539,773 A | 7/1996 | Knee et al. |
| 5,559,476 A | 9/1996 | Zhang et al. |
| 5,568,064 A | 10/1996 | Beers et al. |
| 5,568,142 A | 10/1996 | Velazquez et al. |
| 5,572,158 A | 11/1996 | Lee et al. |
| 5,572,159 A | 11/1996 | McFarland |
| 5,577,027 A | 11/1996 | Cheng |
| 5,579,004 A | 11/1996 | Linz |
| 5,585,795 A | 12/1996 | Yuasa et al. |
| 5,585,802 A | 12/1996 | Cabler et al. |
| 5,587,681 A | 12/1996 | Fobbester |
| 5,589,788 A | 12/1996 | Goto |
| 5,596,439 A | 1/1997 | Dankberg et al. |
| 5,600,321 A | 2/1997 | Winen |
| 5,613,233 A | 3/1997 | Vagher |
| 5,625,357 A | 4/1997 | Cabler |
| 5,629,652 A | 5/1997 | Weiss |
| 5,648,738 A | 7/1997 | Welland et al. |
| 5,651,029 A | 7/1997 | Yang |
| 5,659,609 A | 8/1997 | Koizumi et al. |
| 5,663,728 A | 9/1997 | Essenwanger |
| 5,666,354 A | 9/1997 | Cecchi et al. |
| 5,684,482 A | 11/1997 | Galton |
| 5,687,330 A | 11/1997 | Gist et al. |
| 5,696,796 A | 12/1997 | Poklemba |
| 5,703,541 A | 12/1997 | Nakashima |
| 5,719,515 A | 2/1998 | Danger |
| 5,726,583 A | 3/1998 | Kaplinsky |
| 5,745,564 A | 4/1998 | Meek |
| 5,757,219 A | 5/1998 | Weedon et al. |
| 5,757,298 A | 5/1998 | Manley et al. |
| 5,760,726 A | 6/1998 | Koifman et al. |
| 5,790,060 A | 8/1998 | Tesche |
| 5,790,658 A * | 8/1998 | Yip et al. ................ 379/406.09 |
| 5,796,725 A | 8/1998 | Muraoka |
| 5,798,661 A | 8/1998 | Runaldue et al. |
| 5,798,664 A | 8/1998 | Nagahori et al. |
| 5,812,597 A | 9/1998 | Graham et al. |
| 5,821,892 A | 10/1998 | Smith |
| 5,822,426 A | 10/1998 | Rasmus et al. |
| 5,825,819 A | 10/1998 | Cogburn |
| 5,834,860 A | 11/1998 | Parsons et al. |
| 5,838,177 A | 11/1998 | Keeth |
| 5,838,186 A | 11/1998 | Inoue et al. |
| 5,841,386 A | 11/1998 | Leduc |
| 5,841,809 A | 11/1998 | Koizumi et al. |
| 5,844,439 A | 12/1998 | Zortea |
| 5,859,552 A | 1/1999 | Do et al. |
| 5,864,587 A | 1/1999 | Hunt |
| 5,880,615 A | 3/1999 | Bazes |
| 5,887,059 A | 3/1999 | Xie et al. |
| 5,894,496 A | 4/1999 | Jones |
| 5,898,340 A | 4/1999 | Chatterjee et al. |
| 5,930,686 A | 7/1999 | Devline et al. |
| 5,936,450 A | 8/1999 | Unger |
| 5,940,442 A | 8/1999 | Wong et al. |
| 5,940,498 A * | 8/1999 | Bardl ......................... 379/394 |
| 5,949,362 A | 9/1999 | Tesche et al. |
| 5,963,069 A | 10/1999 | Jefferson et al. |
| 5,982,317 A | 11/1999 | Steensgaard-Madsen |
| 5,999,044 A | 12/1999 | Wohlfarth et al. |
| 6,005,370 A | 12/1999 | Gustavson |
| 6,014,048 A | 1/2000 | Talaga et al. |
| 6,037,812 A | 3/2000 | Gaudet |
| 6,038,266 A | 3/2000 | Lee et al. |
| 6,043,766 A | 3/2000 | Hee et al. |
| 6,044,489 A | 3/2000 | Hee et al. |
| 6,046,607 A | 4/2000 | Kohdaka |
| 6,047,346 A | 4/2000 | Lau et al. |
| 6,049,706 A | 4/2000 | Cook et al. |

| | | |
|---|---|---|
| 6,052,076 A | 4/2000 | Patton, III et al. |
| 6,057,716 A | 5/2000 | Dinteman et al. |
| 6,067,327 A | 5/2000 | Creigh et al. |
| 6,087,968 A | 7/2000 | Roza |
| 6,094,082 A | 7/2000 | Gaudet |
| 6,100,830 A | 8/2000 | Dedic |
| 6,121,831 A | 9/2000 | Mack |
| 6,137,328 A | 10/2000 | Sung |
| 6,140,857 A | 10/2000 | Bazes |
| 6,148,025 A | 11/2000 | Shirani et al. |
| 6,150,856 A | 11/2000 | Morzano |
| 6,154,784 A | 11/2000 | Liu |
| 6,163,283 A | 12/2000 | Schofield |
| 6,163,289 A | 12/2000 | Ginetti |
| 6,163,579 A | 12/2000 | Harrington et al. |
| 6,166,572 A | 12/2000 | Yamaoka |
| 6,172,634 B1 | 1/2001 | Leonowich et al. |
| 6,173,019 B1 | 1/2001 | Hee et al. |
| 6,177,896 B1 | 1/2001 | Min |
| 6,185,263 B1 | 2/2001 | Chan |
| 6,188,282 B1 | 2/2001 | Montalvo |
| 6,191,719 B1 | 2/2001 | Bult et al. |
| 6,192,226 B1 | 2/2001 | Fang |
| 6,201,490 B1 | 3/2001 | Kawano et al. |
| 6,201,831 B1 | 3/2001 | Agazzi et al. |
| 6,201,841 B1 | 3/2001 | Iwamatsu et al. |
| 6,204,788 B1 | 3/2001 | Tani |
| 6,211,716 B1 | 4/2001 | Nguyen et al. |
| 6,215,429 B1 | 4/2001 | Fischer et al. |
| 6,223,061 B1 | 4/2001 | Dacus et al. |
| 6,236,345 B1 | 5/2001 | Dagnachew et al. |
| 6,236,346 B1 | 5/2001 | Schofield |
| 6,236,645 B1 | 5/2001 | Agazzi |
| 6,249,164 B1 | 6/2001 | Cranford, Jr. et al. |
| 6,249,249 B1 | 6/2001 | Obayashi et al. |
| 6,259,680 B1 | 7/2001 | Blackwell et al. |
| 6,259,745 B1 | 7/2001 | Chan |
| 6,259,957 B1 | 7/2001 | Alexander et al. |
| 6,266,367 B1 | 7/2001 | Strait |
| 6,271,782 B1 | 8/2001 | Steensgaard-Madsen |
| 6,275,098 B1 | 8/2001 | Uehara et al. |
| 6,288,604 B1 | 9/2001 | Shih et al. |
| 6,289,068 B1 | 9/2001 | Hassoun et al. |
| 6,295,012 B1 | 9/2001 | Greig |
| 6,298,046 B1 | 10/2001 | Thiele |
| 6,307,490 B1 | 10/2001 | Litfin et al. |
| 6,309,077 B1 | 10/2001 | Saif et al. |
| 6,313,775 B1 | 11/2001 | Lindfors et al. |
| 6,332,004 B1 | 12/2001 | Chang |
| 6,333,959 B1 | 12/2001 | Lai et al. |
| 6,339,390 B1 | 1/2002 | Velazquez et al. |
| 6,340,940 B1 | 1/2002 | Melanson |
| 6,346,899 B1 | 2/2002 | Hadidi |
| 6,351,229 B1 | 2/2002 | Wang |
| RE37,619 E | 4/2002 | Mercer et al. |
| 6,369,734 B2 | 4/2002 | Volk |
| 6,370,190 B1 | 4/2002 | Young et al. |
| 6,373,417 B1 | 4/2002 | Melanson |
| 6,373,908 B2 | 4/2002 | Chan |
| 6,377,640 B2 | 4/2002 | Trans |
| 6,377,683 B1 | 4/2002 | Dobson et al. |
| 6,385,238 B1 | 5/2002 | Nguyen et al. |
| 6,385,442 B1 | 5/2002 | Vu et al. |
| 6,389,077 B1 | 5/2002 | Chan |
| 6,408,032 B1 | 6/2002 | Lye et al. |
| 6,411,647 B1 | 6/2002 | Chan |
| 6,415,003 B1 | 7/2002 | Raghaven |
| 6,421,377 B1 | 7/2002 | Langberg et al. |
| 6,421,534 B1 | 7/2002 | Cook et al. |
| 6,433,608 B1 | 8/2002 | Huang |
| 6,441,761 B1 | 8/2002 | Viswanathan |
| 6,452,428 B1 | 9/2002 | Mooney et al. |
| 6,462,688 B1 | 10/2002 | Sutardja |
| 6,476,746 B2 | 11/2002 | Viswanathan |
| 6,476,749 B1 | 11/2002 | Yeap et al. |
| 6,477,200 B1 | 11/2002 | Agazzi et al. |
| 6,492,922 B1 | 12/2002 | New |
| 6,501,402 B2 | 12/2002 | Boxho |
| 6,509,854 B1 | 1/2003 | Morita et al. |
| 6,509,857 B1 | 1/2003 | Nakao |
| 6,531,973 B2 | 3/2003 | Brooks et al. |
| 6,535,987 B1 | 3/2003 | Ferrant |
| 6,539,072 B1 | 3/2003 | Donnelly et al. |
| 6,556,677 B1 | 4/2003 | Hardy |
| 6,563,870 B1 | 5/2003 | Schenk |
| 6,570,931 B1 | 5/2003 | Song |
| 6,576,746 B2 | 6/2003 | McBride et al. |
| 6,577,114 B1 | 6/2003 | Roo |
| 6,583,742 B1 | 6/2003 | Hossak |
| 6,594,304 B2 | 7/2003 | Chan |
| 6,606,489 B2 | 8/2003 | Razavi et al. |
| 6,608,743 B1 | 8/2003 | Suzuki |
| 6,633,178 B2 | 10/2003 | Wilcox et al. |
| 6,687,286 B1 | 2/2004 | Leonowich et al. |
| 6,690,742 B2 | 2/2004 | Chan |
| 6,714,825 B1 | 3/2004 | Tanaka |
| 6,721,379 B1 | 4/2004 | Cranford, Jr. et al. |
| 6,731,748 B1 | 5/2004 | Edgar, III et al. |
| 6,744,831 B2 | 6/2004 | Chan |
| 6,744,931 B2 | 6/2004 | Komiya et al. |
| 6,751,202 B1 | 6/2004 | Henrie |
| 6,765,931 B1 | 7/2004 | Rabenko et al. |
| 6,775,529 B1 * | 8/2004 | Roo ............... 455/296 |
| 6,816,097 B2 | 11/2004 | Brooks et al. |
| 6,823,028 B1 | 11/2004 | Phanse |
| 6,844,837 B1 | 1/2005 | Sutardja |
| 6,864,726 B2 | 3/2005 | Levin et al. |
| 6,870,881 B1 | 3/2005 | He |
| 6,882,216 B2 | 4/2005 | Kang |
| 6,975,674 B1 | 12/2005 | Phanse et al. ........ 375/219 |
| 6,980,644 B1 | 12/2005 | Sallaway et al. |
| 7,050,517 B1 | 5/2006 | Sallaway et al. ...... 375/350 |
| 7,327,995 B1 | 2/2008 | Roo |
| 2001/0050585 A1 | 12/2001 | Carr |
| 2002/0009057 A1 | 1/2002 | Blackwell et al. |
| 2002/0061087 A1 | 5/2002 | Williams |
| 2002/0084857 A1 | 7/2002 | Kim |
| 2002/0136321 A1 | 9/2002 | Chan |
| 2002/0181601 A1 | 12/2002 | Huang et al. |
| 2003/0002570 A1 | 1/2003 | Chan |
| 2003/0174660 A1 | 9/2003 | Blon et al. |
| 2004/0005015 A1 | 1/2004 | Chan |
| 2004/0090981 A1 | 5/2004 | Lin et al. |
| 2004/0091071 A1 | 5/2004 | Lin et al. |
| 2004/0105504 A1 | 6/2004 | Chan |
| 2004/0141569 A1 | 7/2004 | Agazzi |
| 2004/0208312 A1 | 10/2004 | Okuda |
| 2005/0025266 A1 | 2/2005 | Chan |

FOREIGN PATENT DOCUMENTS

| | | |
|---|---|---|
| DE | DE 10 2004 017 497 | 11/2004 |
| EP | 0 800 278 | 8/1997 |
| JP | 57-48827 | 3/1982 |
| JP | 58-111415 | 7/1983 |
| JP | 62-159925 | 7/1987 |
| JP | 63-300700 | 7/1988 |
| JP | 63-300700 | 12/1988 |
| JP | 204527 | 8/1989 |
| JP | 3-273704 | 12/1991 |
| JP | 4-293306 | 10/1992 |
| JP | 4-351109 | 12/1992 |
| JP | 05-064231 A | 3/1993 |
| JP | 06-029853 | 2/1994 |
| JP | 06-97831 | 4/1994 |
| JP | 6-276182 | 9/1994 |

| | | |
|---|---|---|
| JP | 7-131260 | 5/1995 |
| JP | 09-55770 | 8/1995 |
| JP | 09-270707 | 3/1996 |
| JP | 10-126183 | 5/1998 |
| JP | 2001-177409 | 12/1999 |
| JP | 06-97831 | 4/2005 |
| JP | 09-270707 | 4/2005 |
| JP | 2001-177409 | 4/2005 |
| TW | 0497334 | 8/2002 |
| TW | 0512608 | 12/2002 |
| TW | 0545016 | 8/2003 |
| WO | WO 99/46867 | 9/1999 |
| WO | WO 00/27079 | 5/2000 |
| WO | WO 00/28663 | 5/2000 |
| WO | WO 00/28663 A2 | 5/2000 |
| WO | WO 00/28663 A3 | 5/2000 |
| WO | WO 00/28668 | 5/2000 |
| WO | WO 00/28691 | 5/2000 |
| WO | WO 00/28691 A2 | 5/2000 |
| WO | WO 00/28691 A3 | 5/2000 |
| WO | WO 00/28712 | 5/2000 |
| WO | WO 00/35094 | 6/2000 |

OTHER PUBLICATIONS

Sedra, et al., "Operational Amplifiers," Microelectronic Circuits, Saunders College Publishing, Third Edition, Chapter 2, (1991), pp. 48, 61-63.

Yamaguchi, et al., "400Mbit/s Submarine Optical Repeater Using Integrated Circuits," Fujitsu Laboratories Ltd. and English Language Translation.

Uda, et al., "125Mbit/s Fiber Optic Transmitter/Receiver with Duplex Connector", Fiber Optic Communications Development Div., NEC Corporation, NEC Engineering, Ltd. and English Language Translation.

Mueller, K.H., "Combining Echo Cancellation and Decision Feedback Equalization," The Bell System Technical Journal, vol. 58, No. 2, Feb. 1979, pp. 491-500.

Bertolaccini, Mario, et al., A Precision Baseline Offset and Drift Corrector for Low-Frequency Applications, IEEE Transactions on Instrumentation and Measurement, vol. IM-34, No. 3, Sep. 1985, pp. 405-412.

Everitt, James, et al., "A CMOS Transceiver for 10-Mb/s and 100-Mb/s Ethernet," IEEE Journal of Solid-State Circuits, vol. 33, No. 12, Dec. 1998, pp. 2169-2177.

Kelly, N. Patrick, et al., "WA 18.5—A Mixed-Signal DFE/FFE Receiver for 100Base-TX Applications," ISSCC 2000/Session 18/Wireline Communications/Paper WA 18.5, 2000 IEEE International Sold-State Circuits Conference, pp. 310-311.

Song, Bang-Sup, et al., "FP 12.1: NRZ Timing Recovery Technique for Band-Limited Channels," ISSCC 96/Session 12/Serial Data Communications/Paper FP 12.1, 1996 IEEE International Solid State Circuits Conference pp. 194-196.

Linear Technology, High Speed Modem Solutions, InfoCard 20, Linear Technology Corporation.

Linear Technology, LT1355/LT1356, Dual and Quad 12MHz, 400V/us Op Amps, Linear Technology Corporation, pp. 1-16.

Linear Technology, LT1358/LT1359, Dual and Quad 25MHz, 600V/us Op Amps, Linear Technology Corporation, pp. 1-12.

Linear Technology, LT1361/LT1362, Dual and Quad 50MHz, 800V/us Op Amps, Linear Technology Corporation, pp. 1-12.

Linear Technology, LT1364/LT1365, Dual and Quad 70MHz, 1000V/us Op Amps, Linear Technology Corporation, pp. 1-12.

Linear Technology, LT1813/LT1814, Dual/Quad 3mA, 100MHz, 750V/us Operational Amplifiers, Linear Technology Corporation, pp. 1-16.

Stephens, "Active Output Impedance for ASDL Line Drivers", Nov. 2002.

Hellwarth, et al., "Digital-to-analog Converter having Common-mode Isolation and Differential Output".

Millman, et al., "Pulse, Digital, and Switching Waveforms", pp. 674-675.

Dally, et al., "Digital Systems Engineering", cover and pp. 390-391.

Hamasaki, et al., "A 3-V, 22-mV Multibit Current-Mode ΣΔ DAC with 100 dB Dynamic Range", Dec. 1996, pp. 1888-1894.

Van de Plassche, Integrated Analog-to-Digital and Digital-to-Analog Converters—Chapter 6, pp. 211-271.

Lee, et al., "A CMOS Serial Link for Fully Duplexed Data Communication", Apr. 1995.

Song, et al., FP 12.1: NRZ Timing Recovery Technique for Band-Limited Channels, 1996.

Song, et al., FP 12.1: NRZ Timing Recovery Technique for Band-Limited Channels (Slide Supplement), 1996.

Chien, et al., "TP 12.4: A 900-MHz Local Oscillator using a DLL-based Frequency Multiplier Technique for PCS Applications".

Chien, "Monolithic CMOS Frequency Synthesizer for Cellular Applications", Mar. 12-13.

Chien, "Delay Based Monolithic CMOS Frequency Synthesizer for Portable Wireless Applications", May 20, 1998.

Chien, "Low-Noise Local Oscillator Design Techniques using DLL-based Frequency Multiplier for Wireless Applications", 2000.

Wang, et al., "A 1.2 GHz Programmable DLL-Based Frequency Multiplier for Wireless Applications", Dec. 2004.

Tsutomu Kamoto, "An 8-bit 2-ns Monolithic DAC", Feb. 1988.

Nack, et al., "A Constant Slew Rate Ethernet Line Driver", May, 2001.

Song, "Dual Mode Transmitter with Adaptively Controlled Slew Rate and Impedance Supporting Wide Range Data Rates", 2001.

Weaver, Jr., "A Third Method of Generation and Detection of Single-Sideband Signals,"Dec. 1956, pp. 1703-1705.

Niknejad et al., "Analysis and Optimization of Monolithic Inductors and Transformers for RF ICs," 1997, pp. 375-378.

Weigandt et al., "Analysis of Timing Jitters in CMOS Ring Oscillators," pp. 27-30.

Niknejad et al., "Analysis, Design, and Optimization of Spiral Inductors and Transformers for Si RF IC's," Oct. 1998, pp. 1470-1481.

Gray et al., Analysis and Design of Analog Integrated Circuits, Fourth Edition.

American National Standard, "Fibre Distributed Data Interface (FDDI)—Token Ring Twisted Pair Layer Medium Dependent (TP-PMD)," Sep. 25, 1995.

Nguyen et al., "Si IC-Compatible Inductors and LC Passive Filters," Aug. 1990, pp. 1028-1031.

Gardner, "Charge-Pump Phase-Lock Loops," Nov. 1980, pp. 1849-1858.

Dally et al., "High Performance Electrical Signaling."

Davies, "Digital Generation of Low-Frequency Sine Waves," Jun. 1969, pp. 97-105.

Abidi, "TP 11.1: Direct-Conversion Radio Transceivers for Digital Communications," 1995.

Dolle, "A Dynamic Line-Termination Circuit for Multireceiver Nets," Dec. 1993, pp. 1370-1373.

Su et al., "Experimental Results and Modeling Techniques for Substrate Noise in Mixed-Signal Integrated Circuits," Apr. 1993, pp. 420-430.

Gray et al., "Future Directions in Silicon ICs for RF Personal Communications," 1995, pp. 83-90.

Gabara, "On-Chip Terminating Registers for High Speed ECL-CMOS Interfaces," 1992, pp. 292-295.

Horowitz et al., "High-Speed Electrical Signaling: Overview and Limitations," 1998, pp. 12-24.

Sedra et al., Microelectronic Circuits, 3rd ed., 1991.

Yee et al., An Integratable 1-2.5 Gbps Low Jitter CMOS Transceiver with Built in Self Test Capability, 1999.

Intersil, HC-5509B ITU CO/Loop Carrier SLIC, Aug. 2003.

Regan, ADSL Line Driver/Receiver Design Guide, Part 1, Feb. 2000.

Phillps, The HC-5502X14X Telephone Subscriber Line Interface Circuits (SLIC), Jan. 1997.

Fuad et al., An Operational Amplifier Circulator Based on the Weighted Summer, Jun. 1975.

Narayanan et al., Doppler Estimation Using a Coherent Ultrawide-Band Random Noise Radar, Jun. 2000.

Stephens, Acitve Output Impedance for ADLS Line Drivers, Nov. 2002.

High Speed Modem Solutions Info Card 20.

Hellums et al., An ADSL Integrated Active Hybrid Circuit.

Everitt et al., A CMOS Transceiver for 10-Mb/s and 100-Mb/s Ethernet, Dec. 1998.
Azadet et al., A Gigabit Transceiver Chip Set for UTP CA-6 Cables in Digital CMOS Technology, Feb. 2000.
He et al., A DSP Receiver for 1000 Base-T PHY, 2001.
Baird et al., A Mixed Sample 120M s PRML Solution for DVD Systems, 1999.
Baker, An Adaptive Cable Equalizer for Serial Digital Rates to 400Mb/s, 1996.
Chan et al., A 100 Mb/s CMOS 100Base-T4 Fast Ethernet Transceiver for Category 3, 4 & 5 UTP, 1998.
Everitt et al., A 10/100Mb/s CMOS Ethernet Transceiver for 10BaseT, 10BaseTX and 100Base FX, 1998.
Kelly et al., A Mixed Signal DFE/Ffe Receiver for 100BaseTX Applications, 2000.
Shoaei et al., A 3V Low Power 0.25um CMOS 100Mb/s Receiver for Fast Ethernet, 2000.
Walker et al., A Two Chip 1.5 GBd Serial Link Interface, Dec. 1992.
Linear Technology High Speed Modem Solutions Info Card.
Mueller, Combining Echo Cancellation and Decision Feedback Equalization, Feb. 29, 1979.
Roo et al., A CMOS Transceiver Analog Front-end for Gigabit Ethernet over Cat-5 Cables, 2001.
Shoval, A Combined 10/125 Mbaud Twisted Pair Line Driver with Programmable Performance/Power Features, 2000.
Knight, Jr. et al., A Self-Terminating Low-Voltage Swing CMOS Output Driver, 1988, 457-464.
Maneatis, Low-Jitter Process-Independent DLL and PLL Based on Self-Biased Techniques, Nov. 1996, 1723-1732.
Chang et al., Large Suspended Inductors on Silicon and Their Use in a 1-um CMOS RF Amplifier, May 1993, 246-248.
Gharpurey et al., Modeling and Analysis of Substrate Coupling in Integrated Cicuits, Mar. 1996, 344-353.
Young et al., Monolithic High-Performance three-Dimensional Coil Inductors for Wireless Communications, 1997.
Efendovich et al., Multifrequency Zero-Jitter Delay-Locked Loop, Jan. 1994, 67-70.
Munshi et al., Adaptive Impedance Matching, 69-72.
Niknejad et al., Numerically Stable Green Function for Modeling and Analysis fo Substrate Coupling in Integrated Circuits, Apr. 1998, 305-315.
Hajimiri et al., Phase Noise in Multi-Gigahertz CMOS Ring Oscillators, 1998, 49-52.
Kim et al., PLL/DLL System Noise Analysis for Low Jitter Clock Synthesizer Design, 31-34.
Rudell et al., Recent Developments in High Integration Multi-Standard CMOS Transceivers for Personal Communications Systems, 1998, 149-154.
Shoval et al., A 100 Mb/s BiCMOS Adaptive Pulse-Shaping Filter, Dec. 1995, 1692-1702.
Jansen et al., SP 23.8: Silicon Bipolar VCO Family for 1.1 to 2.2 GHz with Fully-Integrated Tank and Tuning Circuits, Feb. 8, 1997, 392-393 & 492.
Liberali et al., "Progress in High-Speed and High—Resolution CMOS Data Converters", Sep. 12-14, 1995, pp. 19-28.
Sedra et al., "Micro-Electronic Circuits", 1982, pp. 95-97 and 243-247.
DP832220 CDL™ Twisted Pair FDDI Transceiver Device, Oct. 1992.
Su et al., "A CMOS Oversampling D/A Converter with a Current-Mode Semidigital Reconstruction Filter", Dec. 1993, pp. 1224-1233.
Goldberg, Gigabit Ethernet PHY Chip Sets LAN Speed Record for Copper Story 6 pages.
Miki et al., "An 80-MHz 8-bit CMOS D/A Converter", Dec. 1986, pp. 983-988.
Letham et al., "A high-performance CMOS 70-Mhzpalette/DAC", Dec. 1987, pp. 1041-1047.
Nakamura et al., "A 10-b 70-MS/s CMOS D/A/ converter", Apr. 1991, pp. 637-642.
Takakura et al., "A10 bit 80 MHz glitchless CMOS D/A/ converter", May 1991, pp. 26.5.1-26.5.4.
Fournier et al., "A 130-MHz 8-b CMOS video DAC for HDTV applications", Jul. 1991, pp. 1073-1077.

Reynolds, "A 320 MHz CMOS triple 8b DAC with on-chip PLL and hardware cursor", Feb. 1994, pp. 50-51.
Chin et al., "A 10-b 125 MHz CMOS digital-to-analog (DAC) with threshold-voltage compensated current sources", Nov. 1994, pp. 1374-1380.
Wu et al., A low glitch 10-bit 75-MHz CMOS video D/A converter, Jan. 1995, pp. 68-72.
The Authoritative Dictionary of IEEE Standards Stems 7th Edition, p. 280.
Gray et al., Analysis and Design of Analog Integrated Circuits, 1997.
Sedra et al., Microelectronic Circuits, Third Edition, 1991, pp. 48-115.
Shoval et al., "WA 18.7—A Combined 10/125 Mbaud Twisted Pair Line Driver with Programmable Performance/Power Features," 2000, pp. 314-315.
Chien, "Delay Based Monolithic CMOS Frequency Synthesizer for Portable Wireless Applications", May 20, 1998.
Chien, "Low-Noise Local Oscillator Design Techniques using DLL-based Frequency Multiplier for Wireless Applications", 2000.
Cho et al.; "A Single-Chip CMOS Direct Conversion Transceiver for 900 MHz Spread-Spectrum Digital Cordless Telephones"; 1999.
Shoval et al.; "A CMOS Mixed-Signal 100Mb/s Receive Architecture for Fast Ethernet"; 1999.
Hester et al.; "CODEC for Echo-Canceling Full-Rate ADSL Modems"; Dec. 1999.
Nack, et al., "A Constant Slew Rate Ethernet Line Driver", May 2001.
Yee et al., An Integratable1-2.5 Gbps Low Jitter CMOS Transceiver with Built in Self Test Capability, 1999.
Fuad Surial Atiya, et al., An Operational Amplifier Circulator Based on the Weighted Summer, Jun. 1975.
Stephens, Active Output Impedance for ADLS Line Drivers, Nov. 2002.
Lee, et al., A 3V 10b 100 MS/s Digital-to-Analog Converter for Cable Modem Applications, Aug. 28-30, 2000 pp. 203-205.
Rudell, et al., "SA 18.3: A 1.9 GHz Wide-band IF Double Conversion CMOS Integrated Receiver for Cordless Telephone Applications," 1997, pp. 304-305, 476.
Young, et al., Monolithic High-Performance three-Dimensional Coil Inductors for Wireless Communications, 1997.
Wu, et al., A low glitch 10-bit 75 MHz CMOS video D/A converter, Jan. 1995, pp. 68-72.
Johns, et al., "Integrated Circuits for Data Transmission Over Twisted Pair Channels", mar. 1997, pp. 398-406.
"IEEE Standard 082.3: Part 3 Carrier Sense Multiple access with Collision Detection (CSMA/CD) Access Method and Physical Detection", Mar. 8, 2002, pp. 1-1538.
Young, et al., "A Low-Noise RF Voltage-Controlled Oscillator Using On-Chip High-Q Three Dimensional coil Inductor and Micromachined Variable Capacitor", Jun. 8-11, 1998, pp. 128-131.
Young, et al., "A Micromachined Variable Capacitor for Monolithic Low-Noise VCOS", 1996, pp. 86-89.
Abidi, et al., "FA 7.2: The Future of CMOS Wireless Transceivers", Feb. 7, 1997, pp. 118-119, 440
Eto, et al., "A 333 MHz, 20mW, 18ps Resolution Digital DLL using Current-controlled Delay with Parallel Variables Resistor DAC (PVR-DAC)", Aug. 28-30, 2000, pp. 349-350.
Ivan Jorgensen, et al., "Design of a 10-bit 100 MSamples/s BiCMOS D/A Converter", 1996, pp. 730-733.
Henriques, et al., "A CMOS Steering-Current Multiplying Digital-to-Analog Converter", 1995, pp. 145-155.
Wikner, et al., "Modeling of CMOS Digital-to-Analog Converters for Telecommunication", May 1999, pp. 489-499.
Van der Plas, et al., "A 14-Bit Intrinsic Accuracy $Q^2$ Random Walk CMOS DAC", Dec. 1999, pp. 1708-1718.
Radke, et al., "A 14-Bit Current-Mode $\Sigma\Delta$ DAC Based Upon Rotated Data Weighted Averaging", Aug. 2000, pp. 1074-1084.
Shui, et al., "Mismatch shaping for a Current-Mode Multibit Delta-Sigma DAC", Mar. 1999, pp. 331-338.
Niknejad et al., Numerically Stable Green Function for Modeling and Analysis of Substrate Coupling in Integrated Circuits, Apr. 1998, 305-315.
Shovall et al., A 100 Mb/s BiCMOS Adaptive Pulse-Shaping Filter, Dec. 1995, 1692-1702.

Liberali et al., "Progress in High-Speed and High-Resolution CMOS Data Converters", Sep. 12-14, 1995, pp. 19-28.
DP83220 CDL ™ Twisted Pair FDDI Transceiver Device, Oct. 1992.
Chan, et al., A 100 Mb/s CMOS 100Base-T3 Fast Ethernet Transceiver for Category 3, 4, & 5 UTP, 1998.
Wang, et al., A 1.2 GHz programmable DLL-Based Frequency Multiplier for Wireless Applications, Dec. 2004.
Gray, et al., Analysis and Design of Analog Integrated Circuits, pp. 270 & 274.
Gray et al., Analysis and Design of Analog Integrated Circuits, Fourth Edition, pp. 217-221.
Sedra, et al., Microelectronic Circuits, 3rd Edition, 1991.
Rao, Short Course: Local Area Networks.
Razavi, Principles of Data Conversion System Design.
Mano, Digital Logic and Computer Design.
Farjad-rad, et al., 4.5 A 0.2-2GHz 12mW Multiplying DLL for Low-Jitter Clock Synthesis in Highly Integrated Data Communication Chip.
Gotoh, et al., All-Digital Multi-Phase Delay Locked Loop for Internal Timing Generation in Embedded and/or High-Speed DRAMS.
Johnson, et al., THAM 11.2: A Variable Delay Line Phase Locked Loop for CPU-Coprocessor Synchronization.
Sonntag, et al., FAM: 11.5: A Monolithic CMOS 10MHz DPLL for Burse-Mode.
Garlepp, et al., A Portable Digital DLL Architecture for CMOS Interface Circuits.
Lin, et al., A Register-Controller Symmetrical DLL for Double-Data-Rate DRAM.
Garlepp, et al., A Portable Digital DLL for High-Speed CMOS Interface Circuits.
Dehng, et al., Clock-Deskaw Buffer Using a SAR-Controlled Delay-Locked Loop.
Kim, et al., A Low-Power Small-Area 7.28-ps-Jitter 1-GHz DLL-Based Clock Generator.
Dehng, et al., A Fast-Lock Mixed-Mode DLL Using a 2-b SAR Algorithm.
Lin, et al., A 10-b 500-MSample/s CMOS DAC in 0.6mm2.
Dunning, Jim, "An All-Digital Phase-Locked Loop with 50-Cycle Lock Time Suitable for High-Performance Microprocessors," IEEE Journal of Solid-State Circuits, vol. 30, No. 4, Apr. 1995, pp. 412-422.
Maneatis, John G., "FA 8.1: Low-Jitter and Process-Independent DLL and PLL Based on Self-Biased Techniques".
Moon, Yongsam, et al., "An All-Analog Multiphase Delay-Locked Loop Using a Replica Delay Line for Wide-Range Operation and Low-Jitter Performance," IEEE Journal of Solid-State Circuits, vol. 35, No. 3, Mar. 2000, pp. 377-384.
Wang, HongMo, "WP 23.8: A 9.8GHz Back-Gate Tuned VCO in 0.35µm CMOS," ISSCC99, Session 23, Paper WP 23.8, 1999 IEEE International Solid-State Circuits Conference, pp. 406-407 & 484.
Rudell, et al., "SA 18.3: A 1.9 GHz Wide-Bank IF Double Conversion CMOS Integrated Receiver for Cordless Telephone Applications," 1997, pp. 304-305, 476.
Dally, William J., et al., "High-Performance Electrical Signaling," Publication and date unknown.
Sailesh Rao; Short Course: Local Area Networks, International Solid State Circuits Conference; Sailesh Rao; Outline Implementing Gigabit Ethernet Over Cat-5 Twisted-Pair Cabling; Jack Kenny; Signal Processing and Detection in Gigabit Ethernet; 3 pages.
Kamran Azadet and Chris Nicole; Low-Power Equalizer Architectures for High-Speed Modems; Oct. 1998; pp. 118-126.
Techdictionary.com definition of decoder, Link: http://www.teghdictionary.com; 1 page.
University of Pennsylvania CSE Digital Logic Lab re decoders. Link: http://www.cse,dmu.ac.uk/~ sexton/WWW/Pages/cs2.html; 3 pages.
U.S. Appl. No. 09/737,743, filed Dec. 18, 2000, Sutardja.
U.S. Appl. No. 09/920,241, filed Aug. 1, 2001, Sutardja.
"IEEE Standard 802.3: Part 3 Carrier Sense Multiple Access with Collision Detection (CSMA/CD) Access Method and Physical Detection", Mar. 8, 2002, pp. 1-1538.
Abidi, et al., "FA 7.2: The Future of CMOS Wireless Transceivers", Feb. 7, 1997, pp. 118-119.
Eto, et al., "A 333 MHz, 20mW, 18ps Resolution Digital DLL using Current-controlled Delay with Parallel Variables Resistor DAC (PVR-DAC)", Aug. 28-30, 2000, pp. 349-350.
Hamasaki, et al., "A 3-V, 22-mV Multibit Current-Mode ΣΔDAC with 100 dB Dynamic Range", Dec. 1996, pp. 1888-1894.
Weaver, Jr., "A Third Method of Generation and Detection of Single Sideband Signals," Dec. 1956, pp. 1703-1705.
Su et al., "Experimental Results and Modeling Techniques for Substrate Noise in Mixed-Signal Integrated Circuits," Apr. 1993, pp. 420-430.
Gabara, "On-Chip Terminating Registers for High-Speed ECL-CMOS Interfaces," 1992, pp. 292-295.
Kim et al., "A 30-MHz Hybrid Analog/Digital Clock Recovery Circuit in 2-µm CMOS," 1990, pp. 1385-1394.
Liu et al., "WP 23.7: A 6.5 GHz Monolithic CMOS Voltage-Controlled Oscillator," 1999, pp. 404-405, 484.
Wang et al., "WP 23.8: A 9.8 GHz Back-Gate Tuned VCO in 0.35 µm CMOS," 1999, pp. 406-407, 484.
Rofougaran et al., "SP 24.6: A 900 MHz CMOS LC Oscillator with Quadrature Outputs," 1996.
Koullias et al., "TP 9.2: A 900 MHz Transceiver Chip Set for Dual-Mode Cellular Radio Mobile Terminals," 1993, pp. 140-141, 278.
Dauphinee et al., "SP 23.7: A Balanced 1.5 GHz Voltage Controlled Oscillator with an Integrated LC Resonator," 1997, pp. 390-391, 491.
Banu et al., "A BiCMOS Double-Low-IF Receiver for GSM," 1997, pp. 521-524.
Chang et al., "A CMOS Channel-Select Filter for a Direct-Conversion Wireless Receiver," 1996, pp. 62-63.
Waizman, "FA 18.5: A Delay Line Loop for Frequency Synthesis of De-Skewed Clock," Feb. 18, 1994, pp. 298-299.
Kinget, "FP 14.7: A Fully Integrated 2.7V 0.35µm CMOS VCO for 5 GHz Wireless Applications," Feb. 5, 1998.
Lee et al., "A Fully Integrated Low-Noise 1-GHz Frequency Synthesizer Design for Mobile Communication Application," May 1997, pp. 760-765.
Parker et al., "A Low-Noise 1.6 GHz CMOS PLL with On-Chip Loop Filter," 1997, pp. 407, 409-410.
Park et al., "A Low-Noise, 900-MHz VCO in 0.6µm CMOS," May 1999, pp. 586-591.
Soyuer et al., "A Monolithic 2.3-Gb/s 100-mW Clock and Data Recovery Circuit in Silicon Bipolar Technology," Dec. 1993, pp. 1310-1313.
Hu et al., "A Monolithic 480 Mb/s Parallel AGC/Decision/Clock-Recovery Circuit in 1.2-µm CMOS," Dec. 1993, pp. 1314-1320.
Parameswaran et al., "A New Approach for the Fabrication of Micromechanical Structures," Dec. 6, 1998, pp. 289-307.
Shoval et al., "WA 18.7—A Combined 10/125 Mbaud Twisted-Pair Line Driver with Programmable Performance/Power Features," 2000, pp. 314-315.
Myson Technology, "MTD214—Ethernet Encoder/Decoder and 10BaseT Transceiver with Built-in Waveform Shaper," 1997, pp. 1-11.
Myson Technology, "MTD972 (Preliminary) 100BaseTX PCS/PMA," 1997, pp. 1-21.
Craninckx et al., "A 1.8-GHz Low-Phase-Noise CMOS VCO Using Optimized Hollow Spiral Inductors," 1997, pp. 736-744.
Craninckx et al., "A 1.8-GHz Low-Phase-Noise Voltage-Controlled Oscillator with Prescaler," 1995, pp. 1474-1482.
Hung et al., "A 1.24-GHz Monolithic CMOS VCO with Phase Noise of 137 dBc/Hz at a 3-MHz Offset," 1999, pp. 111-113.
Rudell et al., "A 1.9-GHz Wide-Band IF Double Conversion CMOS Receiver for Cordless Telephone Applications," 1997, pp. 2071-2088.
Lin et al., "TP 12.5: A 1.4 GHz Differential Low-Noise CMOS Frequency Synthesizer using a Wideband PLL Architecture," 2000, pp. 204-205, 458.
Razavi, "SP 23.6: A 1.8 GHz CMOS Voltage-Controlled Oscillator," 1997, pp. 388-389.
Dec et al., "MP 4.8: A 1.9 GHz Micromachine-Based Low-Phase-Noise CMOS VCO," 1999, pp. 80-81, 449.
Sato et al., "SP 21.2: A 1.9 GHz Single-Chip IF Transceiver for Digital Cordless Phones," Feb. 10, 1996.

Lee et al., "A 2.5 V CMOS Delay-Locked Loop for an 18 Mbit, 500 Megabytes/s DRAM," 1994, pp. 1491-1496.
Joo Leong Tham, et al., "A 2.7-V 900-MHz/1.9-GHz Dual-Band Transceiver IC for Digital Wireless Communication," 1999, pp. 286-291.
Lam et al., "WP 23.6: A 2.6 GHz/5.2 GHz CMOS Voltage-Controlled Oscillator," 1999, pp. 402-403, 484.
Marshall et al., "TA 8.7: A 2.7V GSM Transceiver ICs with On-Chip Filtering," 1995.
Shoval et al., A 100Mb/s BiCMOS Adaptive Pulse-Shaping Filter, Dec. 1995, 1692-1702.
DP83220 CDL™ Twisted Pair FDDI Transceiver Device, Oct. 1992.
U.S. Appl. No. 60/106,265, filed Oct. 30, 1998, Chan.
"Gigabit Ethernet 1000Base-T," Gigabit Ethernet Alliance, copyright 1997.
The Electrical Engineering Handbook, Chapter 31, "D/A and A/D Converters," Richard C. Dorf, editor, CRC Press, 1993.
Sedra, et al. "Operational Amplifiers," Microelectronics Circuits, Chapter 2, Section 2.4, 3rd Edition, 1991, pp. 61-63.
H4000 Digital Ethernet Transceiver Technical Manual, Distributed Systems, Chapter 3, pp. 3-1 to 3-11, copyright 1982 by Digital Equipment Corporation.
IEEE Standards 802.3ab-2002, "Part 3: Carrier sense multiple access with collision detection (SCMA/CD) access method and physical layer specifications", pp. 147-249.
Goldberg, Lee, "Gigabit Ethernet PHY Chip Sets LAN Speed Record for CopperStory," Tech Insights, Nov. 16, 1998.
"IEEE Standard 802.3: Part 3 Carrier Sense Multiple Access with Collsion Detection (CSMA/CD) Access Method and Physical Detection", Mar. 8, 2002, pp. 1-378.
Harald, et al., "Design of a 10-bit 100 MSamples/s BiCMOS D/A Converter", 1996, pp. 730-733.
Lee, et al., "A 3V 10b 100MS/s Digital-To-Analog Converter For Cable Modem Applications", Aug. 28-30, 2000, pp. 203-205.
Gray et al., "Future Directions in Silicon ICs for RF Personal Communcations," 1995, pp. 83-90.
Gabara, "On-Chip Terminating Registers for High Speed ECL-CMOS Interfaces," 1992, pp. 292-295.
Rofougaran et al., "SP 24.6: A 900 MHz CMOS LC-Oscillator with Quadrature Outputs," 1996.
Parker et al., "A Low-Noise 1.6GHz CMOS PLL with On-Chip Loop Filter," 1997, pp. 407, 409-410.
Cho et al., "TP 13.5: A Single-Chip CMOS Direct-Conversion Transceiver for 900 MHz Spread-Spectrum Digital Cordless Phones," 1999, pp. 228-229, 464.
Sedra et al., Microelectronic Circuits, Third Edition, 1991, pp. 86-92.
Moon et al., "An All Analog Multiphase Delay Locked Loop Using a Replica Delay Line for Wide Range Operation and Low-Jitter Performance," Mar. 2000, pp. 377-384.
I.E.E.E. Standard 082.3: Part 3, "Carrier Sense Multiple Access with Collision Detection (CSMA/CD) Access Method and Physical Detection," Mar. 8, 2002, pp. 1-378.
Myson Technology,"MTD972 (Preliminary) 100BaseTX PCS/PMA," 1997, pp. 1-21.
Craninckx et al., "A 1.8-GHz Low-Phase-Noise CMOS VCO Using Optimized Hollow Spiral Inductors," 1995, pp. 1474-1482.
Hung et al., "A 1.24-GHz Monolithic CMOS VCO with Phase Noise of 137 dBc/Hz at a 3-MHz Offset," 1999, pp. 111-113.
Rudell et al., "A 1.9-GHz Wide Band IF Double Conversion CMOS Receiver for Cordless Telephone Applications," 1997, pp. 2071-2088.
Rudell et al., "SA 18.3: A 1.9 GHz Wide-band IF Double Conversion CMOS Integrated Receiver for Cordless Telephone Applications," 1997, pp. 304-305, 476.
Leong et al., "A 2.7-V 900-MHz/1.9-GHz Dual Band Transceiver IC for Digital Wireless Communication," 1999, pp. 286-291.
Lam et al., "WP 23.6: A 2.6 GHz CMOS Voltage-Controlled Oscillator," 1999, pp. 402-403, 484.
Phillps, The HC-5502X14X Telephone Subscriber Line Interface Circuits (SLIC), Jan. 1997.
Everitt et al., A CMOS Transceiver for 10-Mb/s and 100-Mb/s Ethernet, Dec. 1998.
Falconer; "Echo Cancellation in Two Wire Full Duplex With Estimation of Far-End Data Components"; Aug. 13, 1985.
Gawargy; "Electronic Hybrid Circuit"; Oct. 31, 1989.
U.S. Appl. No. 60/107,105, filed Nov. 4, 1998, Chan.
U.S. Appl. No. 60/107,702, filed Nov. 9, 1998, Chan.
U.S. Appl. No. 60/108,001, filed Nov. 11, 1998, Chan.
Stonick et al; An Adaptive PAM-4 5-Gb/s Backplane Transceiver in 0.25-um CMOS; IEEE Journal of Solid-State Circuits, vol. 38, No. 3, Mar. 2003; pp. 436-443.
Sedra, et al. "Operational Amplifiers," Microelectronic Circuits, Chapter 2, Section 2.4, 3rd Edition, 1991, pp. 61-63.
I.E.E.E. Standard 802.3: Part 3, "Carrier Sense Multiple Access with Collision Detection (CSMA/CD) Access Method and Physical Detection," Mar. 8, 2002, pp. 1-378.
Craninckx et al., "A 1.8-GHz Low-Phase-Noise CMOS VCO Using Optimized Hollow Spiral Inductors," 1995, pp. 1474-1482.
Leong et al., "A 2.7-V 900-MHz/1.9-GHz Dual-Band Transceiver IC for Digital Wireless Communication," 1999, pp. 286-291.
Lam et al., "WP 23.6: A 2.6 GHz/5.2 GHz CMOS Voltage-Controlled Oscillator," 1999, pp. 402-403, 484.
Marshall et al., "TA 8.7: A 2.7V GSM Tranceiver ICs with On-Chip Filtering," 1995.
Joo Leong Tham, et al., "A 2.7-V 900-MHz/1.9-GHz Dual-Band Transceiver IC for Digital Wireless Communication," 1999, pp. 286-291.
Dunning, Jim "An All-Digital Phase-Locked Loop with 50-Cycle Lock Time Suitable for High-Performance Microprocessors," IEEE Journal of Solid-State Circuits, vol. 30, No. 4, Apr. 1995, pp. 412-422.
Azadet, Kamran and Nicole, Chris; "Low-Power Equalizer Architectures for High-Speed Modems"; Oct. 1998; pp. 118-126.
Chien et al; "TP 12.4: A 900-MHz Local Oscillator using a DLL-based Frequency Multiplier Technique for PCS Applications"; Journal of IEEE Solid State Circuits; Feb. 2000; pp. 202-203 and 458.
Chien; "Low-Noise Local Oscillator Design Techniques using DLL-Based Frequency Multiplier for Wireless Applications"; Dissertation; Univ. of Calif., Berkley; Apr. 2000.
Chien; "Monolithic CMOS Frequency Synthesizer for Cellular Applications"; Solid State Circuits, IEEE Journal of, vol. 35, Issue 12, Dec. 2000.
Dally et al; "Digital Systems Engineering"; Cambridge Univ. Press; Jun. 1998; cover and pp. 390-391.
Dally et al; "High Performance Electrical Signaling"; Jun. 1998.
Dehng et al; "A Fast-Lock Mixed-Mode DLL Using a 2-b SAR Algorithm"; IEEE Journal of Solid State Circuits, vol. 36, No. 10; Oct. 2001, pp. 1464-1471.
Dehng et al; "Clock-Deskaw Buffer Using a SAR-Controlled Delay-Locked Loop"; IEEE Journal of Solid State Circuits; Nov. 2002; vol. 35, No. 8; pp. 1128-1136.
Farjad-rad, et al; "4.5 A 0.2-2GHz 12mW Multiplying DLL for Low-Jitter Clock Synthesis in Highly Integrated Data Communication Chip"; 2002; 8 pgs. IEEE - ISSCC - Jan. 2000.
Garlepp et al; "A Portable Digital DLL Architecture for CMOS Interface Circuits", Feb. 1998 Symposium on VLSI Circuits, Digest of Technical Papers, pp. 215-215.
Gotoh et al; "All-Digital Multi-Phase Delay Locked Loop for Internal Timing Generation in Embedded and/or High-Speed DRAMS"; IEEE Symposium on VLSI Circuits, Feb. 1997.
Gray et al, "Analysis and Design of Analog Integrated Circuits", Aug. 9, 2001; Fourth Edition, pp. 217-221.
Gray et al; "Analysis and Design of Analog Integrated Circuits", Apr. 9, 2001; pp. 270 and 274.
He et al; "A DSP Receiver for 1000 Base-T PHY"; IEE Solid State Circuits Conf. 2001, Digest of Tech Papers; IEEE Journal of Solid State Circuits, Feb. 2001.
Heliums et al; "An ADSL Integrated Active Hybrid Circuit"; Aug. 7, 2002.
Hellwarth et al; "Digital-to-analog Converter having Common-mode Isolation and Differential Output"; IBM Journal of Research & Development; Jan. 1973.
IEEE Standards 802.3ab-2002, "Part 3: Carrier sense multiple access with collision detection (CSMA/CD) access method and physical layer specifications"; Mar. 8, 2002; pp. 147-249.

Johnson et al; "THAM 11.2: A Variable Delay Line Phase Locked Loop for CPU-Coprocessor Synchronization"; IEEE Solid State Circuits Conf., Feb. 1988; pp. 142-143; 334-335.

Kelly, N. Patrick et al; "WA 18.5 - A Mixed-Signal DFE/FFE Receiver for 100Base-TX Applications", ISSCC 2000/Session 18/Wireline Communications/Paper WA 18.5, 2000 IEEE Int'l. Solid-State Circuits Conf., Feb. 7, 2000; pp. 310-311.

Kim et al; "A Low-Power Small-Area 7.28-ps-Jitter 1-GHz DLL-Based Clock Generator"; IEEE Journal of Solid State Circuits; Nov. 2002; vol. 37, No. 11: pp. 1414-1420.

Kim et al; "PLL/DLL System Noise Analysis for Low Jitter Clock Synthesizer Design"; 1994 IEEE Symposium on Circuits and Systems; May 1994; pp. 31-34.

Lin et al; "A 10-b, 500-Msample/s CMOS DAC in 0.6mm2"; IEEE; Dec. 1996; 11 pgs.

Lin et al; "A Register-Controller Symmetrical DLL for Double-Data-Rate DRAM"; IEEE Journal Solid State Circuits; Apr. 1999; pp. 565-568.

Lin et al; "TP 12.5: A 1.4 GHZ Differential Low-Noise CMOS Frequency Synthesizer using a Wideband PLL Architecture", Feb. 2000; pp. 204-205 and 458.

Linear Technology, "High Speed Modem Solutions", InfoCard 20, Linear Technology Corporation; www.linear-tech.com; LT/TP 0500 4X; Apr. 1997.

Linear Technology, LT1355/LT1356, Dual and Quad 12MHz, 400V/us Op Amps, Linear Technology Corporation, pp. 1-16; Apr. 1994.

Linear Technology, LT1358/LT1359, Dual and Quad 25MHz, 600V/us Op Amps, Linear Technology Corporation, pp. 1-12; Apr. 1994.

Linear Technology, LT1361/LT1362, Dual and Quad 50MHz, 800V/us Op Amps, Linear Technology Corporation, pp. 1-12; Apr. 1994.

Linear Technology, LT1364/LT1365, Dual and Quad 70MHz, 1000V/us Op Amps, Linear Technology Corporation, pp. 1-12; Apr. 1994.

Linear Technology, LT1813/LT1814, Dual and Quad 3mA, 100MHz, 750V/us Op Amps, Linear Technology Corporation, pp. 1-16; Feb. 2001.

Maneatis, John G.; FA 8.1: Low-Jitter Process-Independent DLL and PLL Based on Self-Biased Techniques; Nov. 1996; pp. 1723-1732.

Mano; "Digital Logic and Computer Design"; Prentice Hall; copyright Jan. 1979; 627 pgs.

Millman et al; "Pulse, Digital, and Switching Waveforms"; Jun. 1965; pp. 674-675.

Munshi et al; "Adaptive Impedance Matching"; Dec. 1999; pp. 69-72.

Rao, Sailesh; Short Course: Local Area Networks, International Solid State Circuits Conference; Sailesh Rao; Outline Implementing Gigabit Ethernet Over Cat-5 Twisted-Pair Cabling; Jack Kenny; Signal Processing and Detection in Gigabit Ethernet; Feb. 1999; 3 pages.

Rao, Sailesh; Short Course; Local Area Networks, International Solid State Circuits Conference; Sailesh Rao; Outline Implementing Gigabit Ethernet Over Cat-5 Twisted-Pair Cabling; Jack Kenny; Signal Processing and Detection in Gigabit Ethernet; Feb. 1999; 3 pages.

Razavi; "Principles of Data Conversion System Design"; Textbook IEEE Press; Jan. 1995; 139 pages.

Roo et al; "A CMOS Transceiver Analog Front-end for Gigabit Ethernet over Cat-5 Cables"; Solid State Circuits Conf., Feb. 5, 2001, Digest of Technical Papers; Journal of IEEE Solid State Circuits, Feb. 2001.

Shoael et al; "A 3V Low Power 0.25μm CMOS 100Mb/s Receiver for Fast Ethernet"; May 6, 2001.

Shoval et al; "WA 18.7 - A Combined 10/125 Mbaud Twisted-Pair Line Driver with Programmable Performance/Power Features", IEEE Int'l. Solid State Circuit Conf. Feb. 2000; Solid State Circuits, IEEE Journal of, vol. 35, Issue 12, Nov. 2000; pp. 314-315.

Song; "Dual Mode Transmitter with Adaptively Controlled Slew Rate and Impedance Supporting Wide Range Data Rates"; ASIC/SOC Conf., Sep. 9-12, 2001.

Sonntag et al; "FAM: 11.5: A Monolithic CMOS 10MHz DPLL for Burse-Mode"; IEEE Solid State Circuits Conf.; Feb. 1990.

Techdictionary.com definition of decoder; Link: http://www.techdictionary.com; Dec. 2005; 1 page.

The Authoritative Dictionary of IEEE Standards Terms, 7th Edition; Jul. 2000; p. 280.

Uda et al; "125Mbit/s Fiber Optic Transmitter/Receiver with Duplex Connector", Fiber Optic Communications Development Div., NEC Corporation, NEC Engineering, Ltd., Fiber and Integrated Optics, vol. 5, Issue 3; Jan. 1985 (and English Language Translation).

University of Pennsylvania CSE Digital Logic Lab re decoders. Link: http://www.cse.dmu.ac.uk/sexton/WWW/Pages/cs2.html; Dec. 2005; 3 pages.

Van de Plassche; "Integrated Analog-to-Digital and Digital-to-Analog Converters - Chapter 6"; Boston: Clower Academic Publishers; May 1994; pp. 211-271.

Weigandt et al; "Analysis of Timing Jitters in CMOS Ring Oscillators"; IEEE Symposium on Circuits and Systems; May 1994; pp. 27-30.

Yamaguchi et al; "400Mbit/s Submarine Optical Repeater Using Integrated Circuits", Fujitsu Laboratories Ltd.; Jan. 1986 (and English Language Translation).

Stonick et al; An Adaptive PAM-4 5-Gb/s Backplane Transceiver in 0.25-um CMOS; IEEE Journal of Solid State Circuits, vol. 38, No. 3, Mar. 2003; pp. 436-443.

* cited by examiner

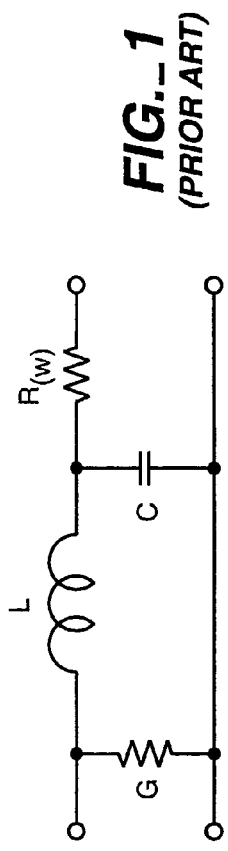
FIG._1
*(PRIOR ART)*
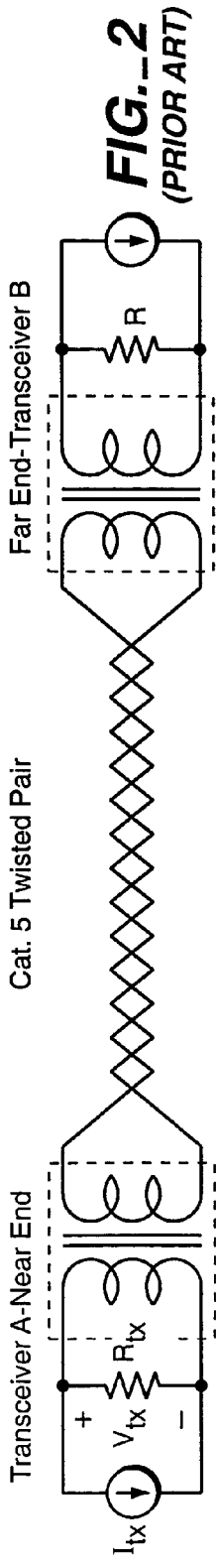
FIG._2
*(PRIOR ART)*
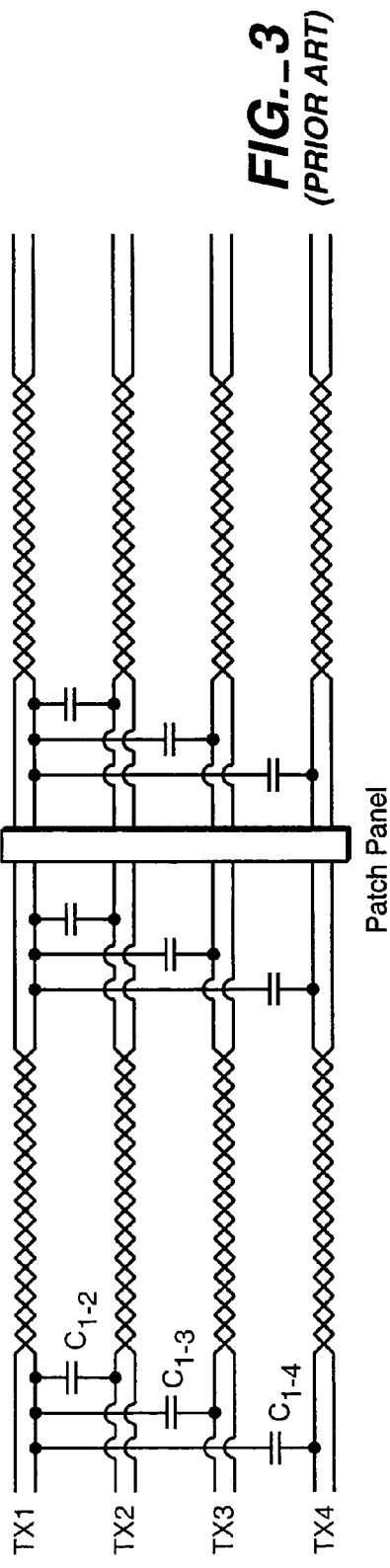
FIG._3
*(PRIOR ART)*

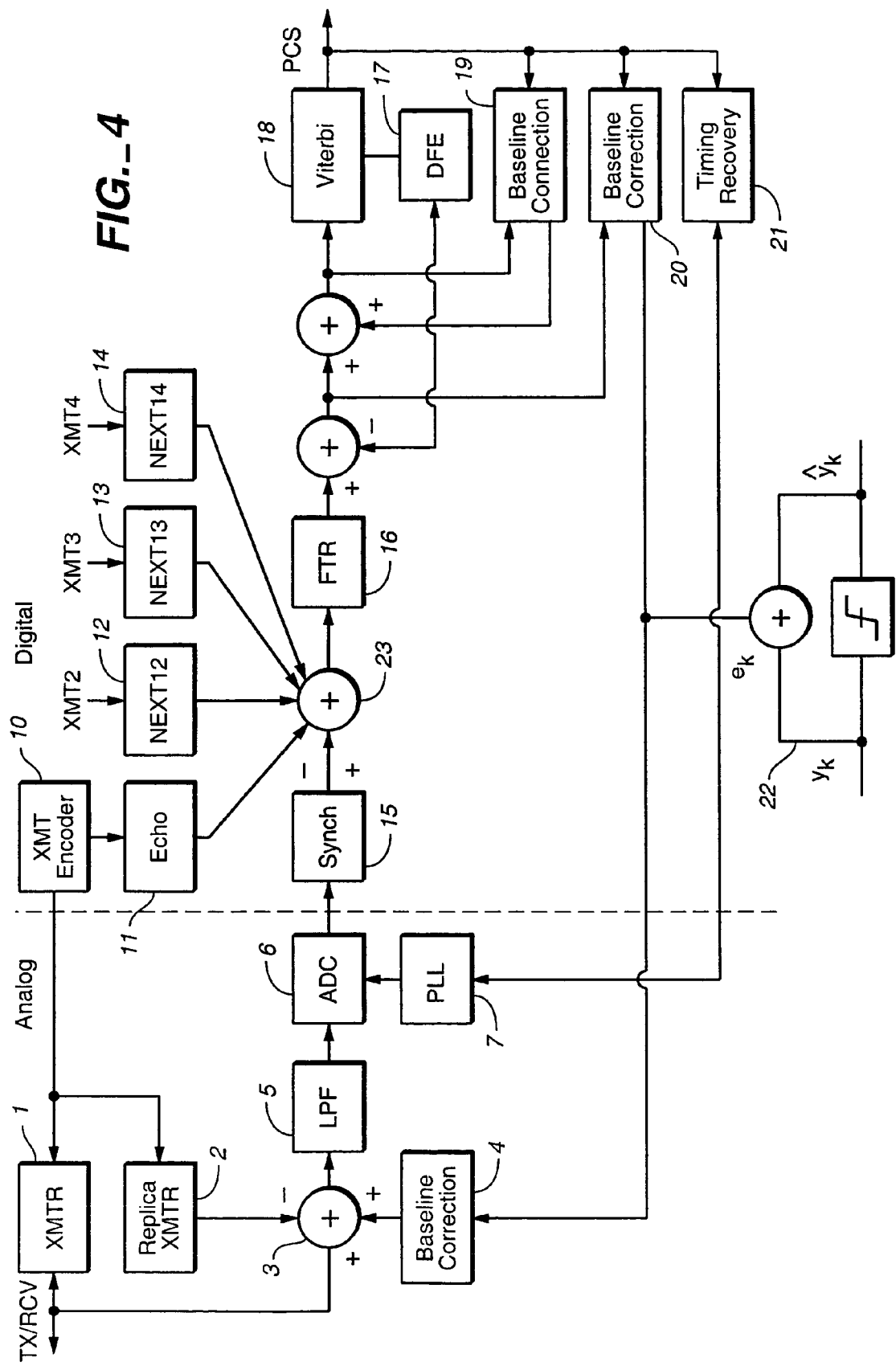
FIG._4

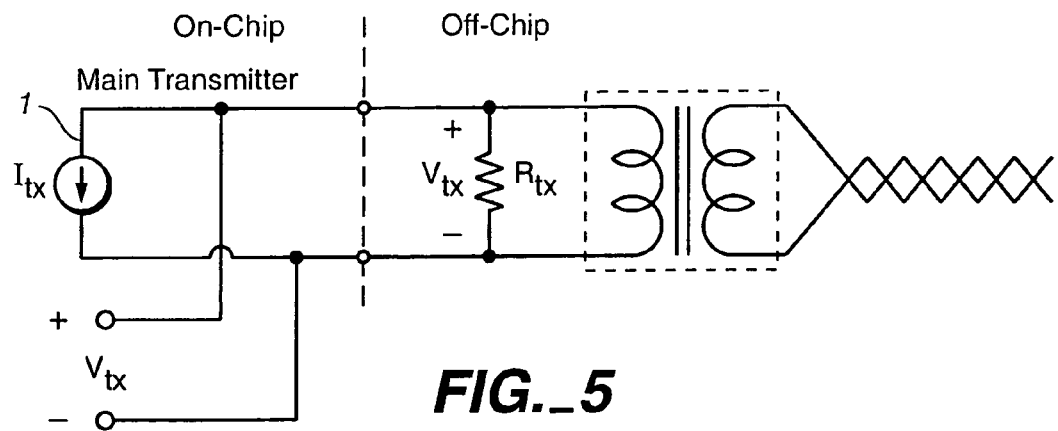
FIG._5
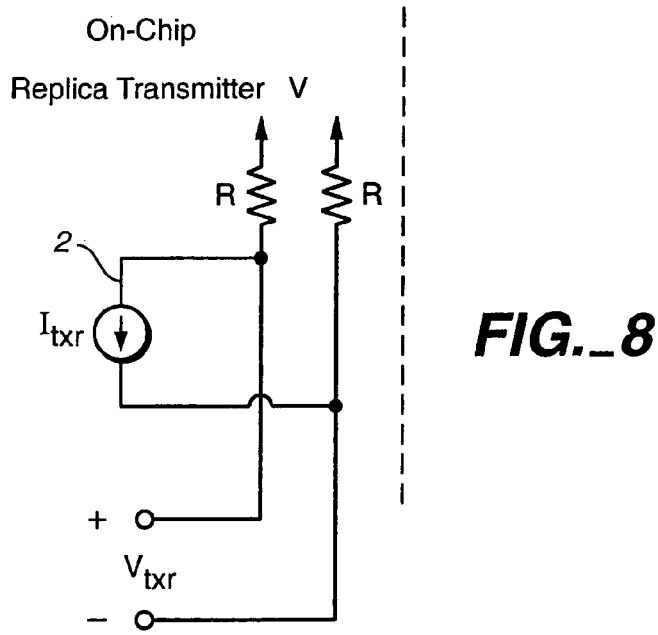
FIG._8
FIG._10

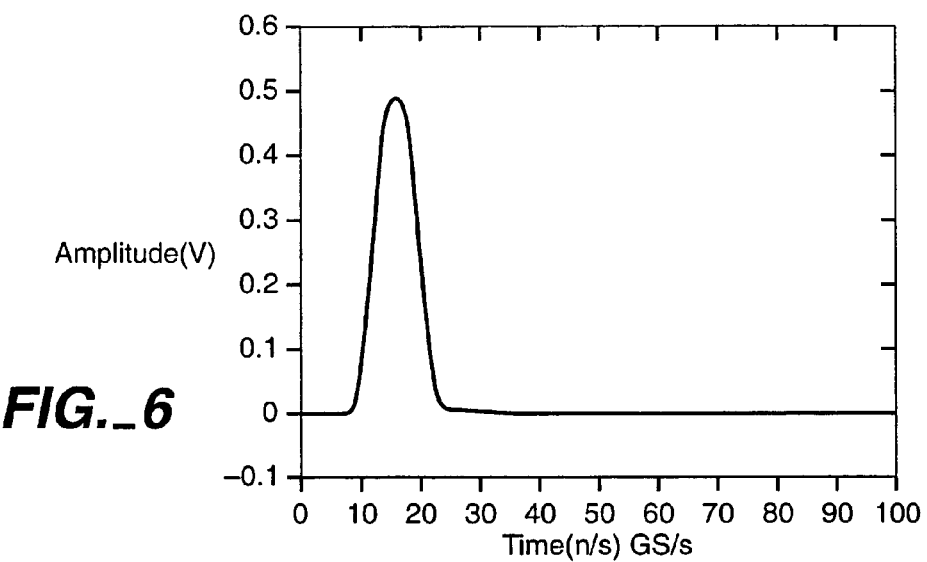
FIG._6
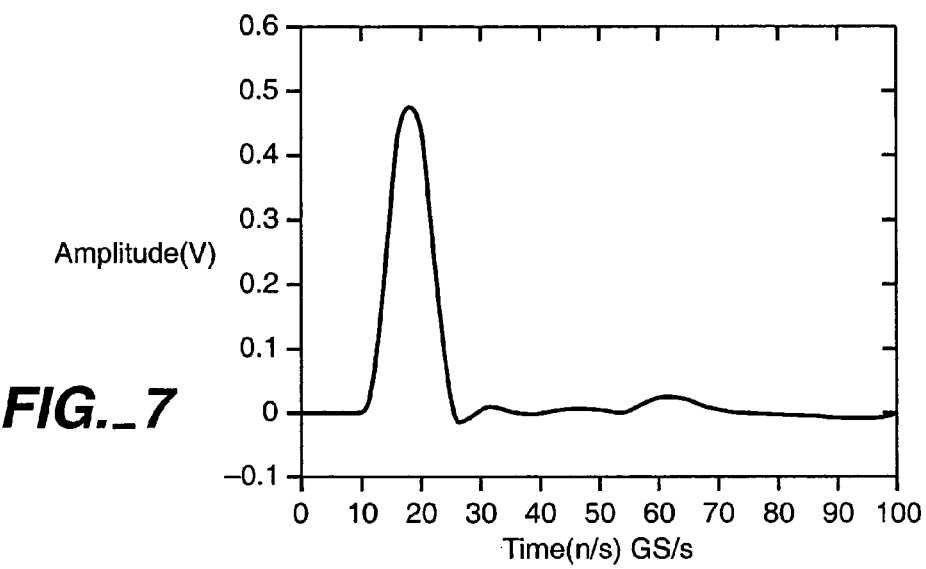
FIG._7
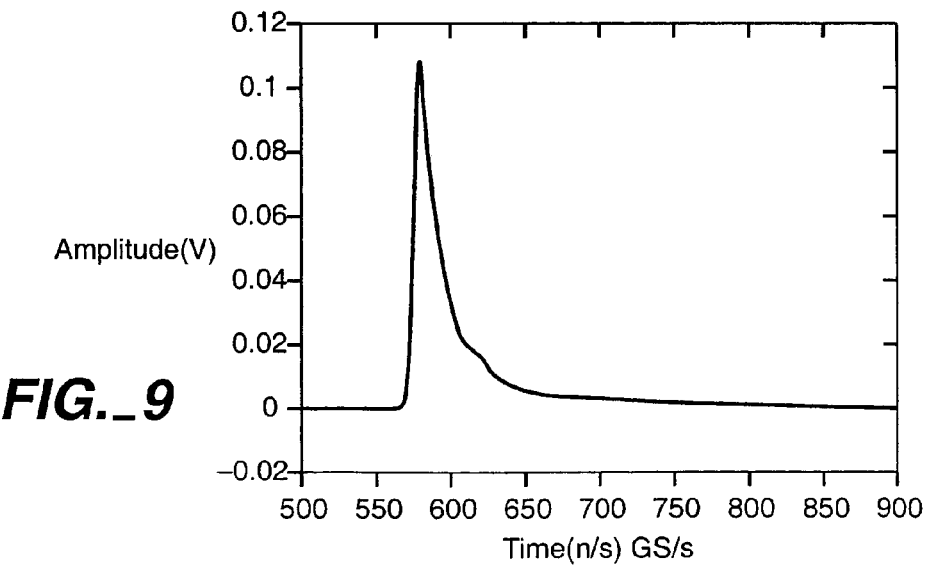
FIG._9

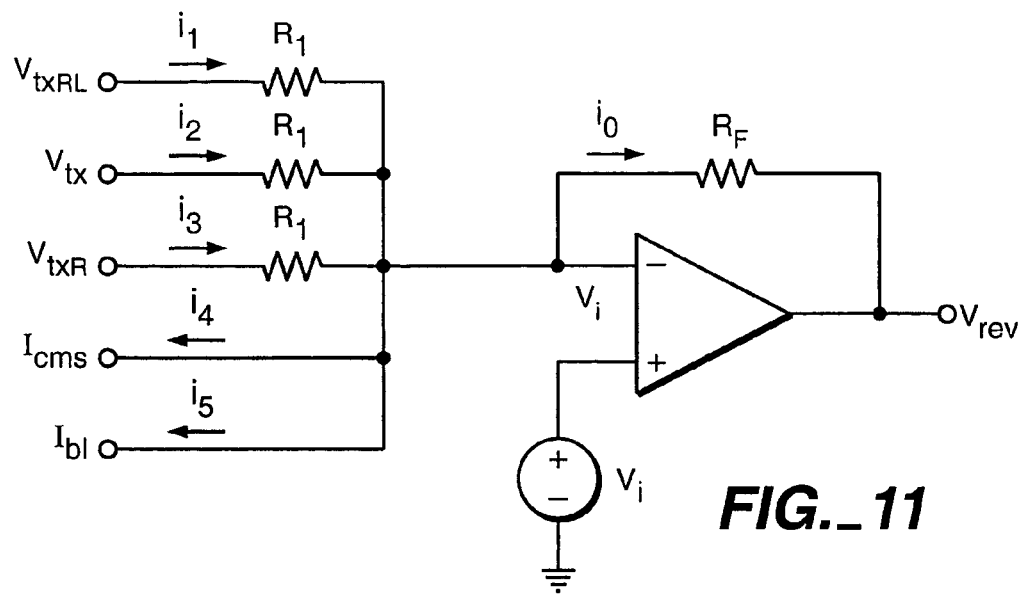
FIG._11
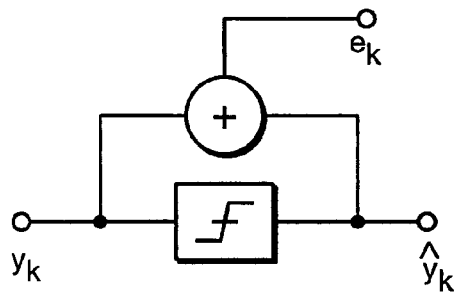
FIG._12
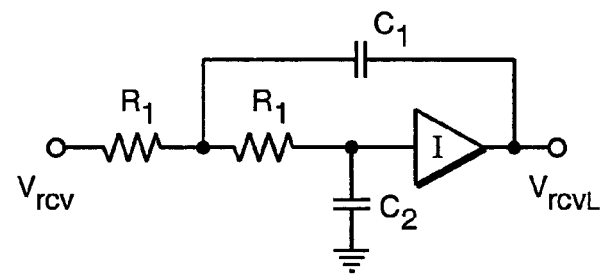
FIG._13
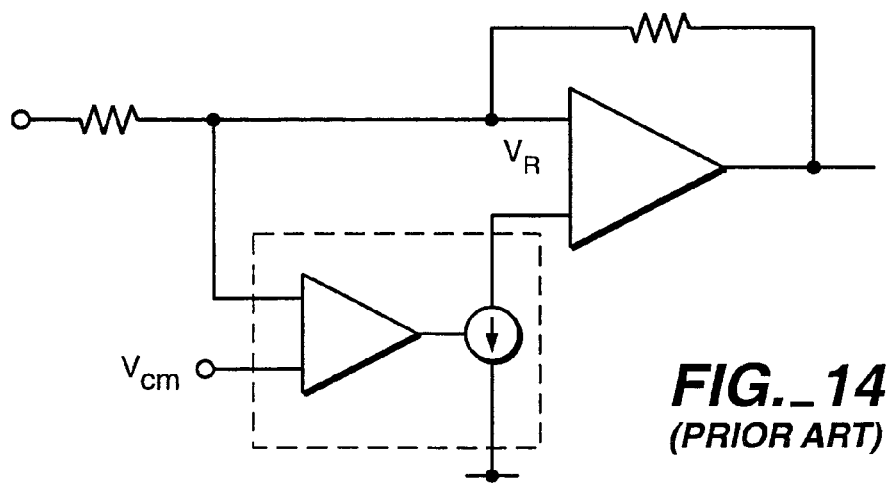
FIG._14
*(PRIOR ART)*

ACTIVE RESISTIVE SUMMER FOR A TRANSFORMER HYBRID

CROSS-REFERENCE TO RELATED APPLICATIONS

This application is a continuation of U.S. application Ser. No. 09/629,092 (now Pat. No. 6,775,529), filed Jul. 31, 2000, now U.S. Pat. No. 6,775,529 the entire content of which is hereby incorporated herein by reference.

BACKGROUND OF THE INVENTION

1. Field of the Invention

The present invention relates generally to transmitting and receiving electrical signals through communication channels, such as a gigabit channel. In particular, the present invention relates to a transmit canceller that removes transmit signals from receive signals in such communication channels.

2. Background and Related Art

A gigabit channel is a communications channel with a total data throughput of one gigabit per second. A gigabit channel typically includes four (4) unshielded twisted pairs (hereinafter "UTP") of cables (e.g., category 5 cables) to achieve this data rate. IEEE Standard 802.3ab, herein incorporated by reference, specifies the physical layer parameters for a 1000BASE-T channel (e.g., a gigabit channel).

As will be appreciated by those skilled in the art, a UTP becomes a transmission line when transmitting high frequency signals. A transmission line can be modeled as a network of inductors, capacitors and resistors, as shown in FIG. 1. With reference to FIG. 1, G is normally zero and R(ω) is complex due to skin effect. R(ω) can be defined by:

$$R(\omega) = k_x(1+j)\sqrt{\omega}, \quad (1)$$

where $k_R$ is a function of the conductor diameter, permeability, and conductivity. The characteristic impedance of the line is defined by:

$$Z_0 = \sqrt{\frac{R(\omega) + j\omega L}{G + j\omega C}}, \quad (2)$$

and at high frequencies, $Z_0$ becomes approximately $\sqrt{L/C}$ or approximately 100 ohms in a typical configuration. When properly terminated, a UTP of length d has a transfer function H that is a function of both length (d) and frequency (ω):

$$H(d,\omega) = e^{d\gamma(\omega)}, \quad (3)$$

where $$\gamma\omega = \sqrt{(R(\omega)+j\omega L)(G+j\omega C)}, \quad (4)$$

substituting Equations 1 and 4 into Equation 3, and simplifying, approximately yields:

$$H(d, \omega) \approx \exp\left\{d\left[\frac{k_n}{2}\sqrt{\frac{\omega L}{C}} + j\left(\omega\sqrt{LC} + \frac{k_n}{2}\sqrt{\frac{\omega L}{C}}\right)\right]\right\}. \quad (5)$$

Equation 5 shows that attenuation and delay are a function of the cable length d.

A transmission path for a UTP typically includes a twisted pair of cables that are coupled to transformers at both a near and far end, as shown in FIG. 2. A transceiver at each end of the transmission path transmits and receives via the same twisted pair. A cable typically includes two patch cords totaling less than 10 m, and a main section of 100 m or even longer. The transmitters shown in FIG. 2 are modeled as current sources. The near end current source supplies a current $I_{tx}$. The near end transmit voltage (e.g., $I_{tx}R_{tx}$) is detected and measured across resistor $R_{tx}$. A receive signal $V_{rcv}$ (e.g., a signal transmitted from the far-end transceiver) is also detected and measured across resistor $R_{tx}$. Hence, $V_{tx}$ includes both transmit ($I_{tx}R_{tx}$) and receive ($V_{rcv}$) signals. Accordingly, the signal $V_{rcv}$ (e.g., the signal from Transceiver B) received at Transceiver A can be obtained by taking the difference between the transmit voltage and the measured voltage $V_{tx}$, as follows:

$$V_{rcv} = V_{tx} - I_{tx}R_{tx}. \quad (6)$$

Conventional solutions for removing transmit signals from receive signals often employ known transconductor ("Gm") summing stages or other current based methods. As will be appreciated, these methods often introduce signal distortion into the receive signal. Also, some transconductors have a limited signal dynamic range. Accordingly, conventional methods are often inadequate for applications requiring signal recovery. Additionally, known summing circuits, such as weighted summers using operational amplifiers, have not heretofore been modified to accommodate the intricacies associated with canceling transmit signals or regulating baseline wander (described below). A known weighted summer is discussed in Chapter 2 of "Microelectronic Circuits, Third Edition," by A. S. Sedra and K. C. Smith, 1991, incorporated herein by reference.

As will be appreciated by those skilled in the art, the receive signal $V_{rcv}$ typically contains additional components, due to baseline wander, echoes and crosstalk, for example.

Baseline wander is preferably corrected for when transmitting and receiving signals over transmission lines. Removing DC components from a receive signal using transformer coupling can cause baseline wander. As will be appreciated by those skilled in the art, baseline wander represents a deviation from an initial DC potential of a signal.

"Echoes" typically represent a residual transmit signal caused by reflections that appear in the receive signal. Echoes can cause undue interference depending on the size of the reflection.

Capacitive coupling between the channels, as shown in FIG. 3, causes crosstalk. Four channels TX1-TX4 are shown in FIG. 3. The capacitive coupling between TX1 and each of TX2, TX3 and TX4 are modeled by capacitors $C_{1-2}$, $C_{1-3}$, $C_{1-4}$, respectively. The capacitive coupling forms a high-pass filter between channels and therefore crosstalk contains mostly high frequency components. As will be appreciated by those skilled in the art, normally only the near-end crosstalk (NEXT) needs to be considered, since crosstalk is usually small and the transmission line provides further attenuation of the far-end crosstalk (FEXT).

Accordingly, there are many signal-to-noise problems to be solved in the art. Hence, an efficient transmission canceller is needed to remove a transmit signal from a receive signal without introducing excess signal distortion. An electrical circuit is also needed to subtract a transmit signal from a receive signal. There is a further need of an electrical circuit to correct baseline wander.

SUMMARY OF THE INVENTION

The present invention relates to a transmit signal canceller for use in a transformer hybrid. Such a hybrid includes a junction for transmitting and receiving signals. In the present invention, an active resistive summer can be used to cancel a transmit signal from a receive signal.

According to the invention, an electrical circuit in a communications channel is provided. The electrical circuit includes an active resistive summer having: (i) an input for a composite signal, the composite signal including a transmission signal component and a receive signal component, (ii) an input for a replica transmission signal, and (iii) an output for a receive signal which includes the composite signal minus the replica signal.

According to an another aspect of the present invention, a transmit signal canceller in a communication channel is provided. The channel includes a first transceiver for transmitting and receiving signals and a replica transmitter for generating a replica transmission signal input. A composite signal at a rear end includes a transmission signal of the first transceiver and a received signal of a second transceiver. The transmit canceller includes: (i) an operational amplifier having a positive input terminal, a negative input terminal, and an output terminal; (ii) a feedback element in communication with the negative input terminal and the output terminal; (iii) a first input resistor in communication with the negative input terminal and the measured signal input; (iv) a second input resistor in communication with the negative input terminal and the replica signal input; and (v) a predetermined voltage source in communication with the positive terminal of the operational amplifier. The receive signal is an output at the output terminal of the operational amplifier.

According to still another aspect of the present invention, a communication system including a first transmission channel with a first end and a second end is provided. The first end couples to a first transformer and the second end couples to a second transformer. A first transceiver transmits and receives signals via the first transformer and a second transceiver transmits and receives signals via the second transformer. A first signal is supplied at the near end. The first signal includes a transmission signal component of the first transceiver and a receive signal component of the second transceiver. The communications system includes: (i) a replica transmitter that generates a replica of the transmission signal component of the first transceiver; (ii) a filter to filter the replica signal; (iii) an active resistive summer receiving the first signal, and the filtered replica signal as inputs to reduce the transmission signal component at an output of the active resistive summer.

According to still another aspect of the present invention, a method of correcting baseline wander in a receive signal in a communications channel having a near and far end is provided. The channel includes a first transceiver at the near end and a second transceiver at the far end, each to transmit and receive signals. The method includes the steps of: (i) providing a composite signal, the composite signal including a transmission signal of the first transceiver and a receive signal of the second transceiver; (ii) generating a replica of the transmission signal; (iii) subtracting the replica signal from the composite signal through an active resistive summer; and (iv) providing a baseline correction current into the active resistive summer.

These and other objects, features, and advantages of the present invention will be apparent from the following description of the preferred embodiments of the present invention.

BRIEF DESCRIPTION OF THE DRAWINGS

The details of the present invention will be more readily understood from a detailed description of the preferred embodiments taken in conjunction with the following figures.

FIG. 1 is a circuit diagram illustrating a transmission line model.

FIG. 2 is a circuit diagram illustrating a transmission path across a twisted pair of cables, the cables being coupled to transformers at each end.

FIG. 3 is a diagram-illustrating crosswalk between channels in a gigabit channel.

FIG. 4 is a block diagram illustrating a system overview of a communications channel.

FIG. 5 is a circuit diagram illustrating a transmitter.

FIG. 6 is a graph illustrating a transmit signal.

FIG. 7 is a graph illustrating a composite signal with echoes.

FIG. 8 is a circuit diagram illustrating a replica transmitter.

FIG. 9 is a graph illustrating a receive signal.

FIG. 10 is block diagram illustrating a low-pass filter.

FIG. 11 is a circuit diagram illustrating an active resistive summer.

FIG. 12 is a circuit diagram illustrating an error detection circuit.

FIG. 13 is a circuit diagram illustrating a low-pass filter.

FIG. 14 is a circuit diagram illustrating a conventional voltage controlled current source.

DETAILED DESCRIPTION OF THE PRESENTLY PREFERRED EMBODIMENTS

The preferred embodiments will be described with respect to a gigabit channel, as used, for example, in an Ethernet network; and to electrical circuits associated with separating transmit and receive signals in such a gigabit channel. The preferred embodiments will also be described with respect to baseline wander correction in such a gigabit channel. However, as will be appreciated by those skilled in the art, the present invention is also applicable to other transmission channels, and to other electrical circuits having applications requiring cancellation of transmit signals, for example.

FIG. 4 is a block diagram illustrating principle components for one of the four channels in a preferred gigabit channel configuration for use in an Ethernet network. As illustrated in FIG. 4, a vertical dashed line divides analog and digital processing components. The analog components preferably include a transmitter ("XMTR") 1, replica transmitter ("Replica XMTR") 2, transmit canceller 3, baseline correction module 4, low pass filter ("LPF") 5, analog-to-digital converter ("ADC") 6, and phase-lock loop ("PLL") 7. A known PLL can be used with the present invention.

Digital processing components preferably include a transmitter encoder 10, echo module 11, NEXT cancellers 12-14 to assist in removing echoes, synchronization module 15, FIR (Finite Impulse Response) equalizer 16 and a DFE (Decision Feedback Equalizer) 17 to equalize a receive signal, and a Viterbi module 18. The digital processing components also include baseline correction modules 19 and 20 to correct residual baseline wander. A timing recovery module 21, an error correction detector 22 (described in further detail below), and summing junction 23 are also shown. The individual digital components designated by blocks in FIG. 3 are all well known in the communication arts, and their specific construction and operation are not critical to the operation or best mode for carrying out the present invention.

The analog "front-end" components shown in FIG. 4 will now be described in even further detail. The front-end analog components are preferably designed and constructed via customized integrated circuits. However, as will be appreciated by those skilled in the art, the inventive circuits and corresponding configuration could also be realized using discrete components as well.

As illustrated in FIG. 5, transmitter 1 preferably includes a current-source $I_{tx}$ that generates a transmit signal over a resistor $R_{tx}$. An appropriated value for resistor $R_{tx}$ can be selected to match the line impedance, for example. In one preferred embodiment, a resistor center tap is set to 2.5 volts so the transmitter 1 effectively sees a differential impedance of 25 ohms. Preferred performance specifications for the transmitter 1 are further detailed in Table 1, below.

An impulse transmit signal can be generated from a unit square pulse of 1 T width filtered by a one-pole, low-pass filter (not shown) with a cutoff frequency between 85 MHz and 125 MHz. Slew-rate control can also be used to limit the rise and fall times and thus reduce the high frequency components of a transmit signal. Of course, any transmit signal preferably fits into the transmit template provided by the IEEE 802.3ab Standard. An ideal transmit pulse is shown in FIG. 6.

A measured voltage $V_{tx}$ across $R_{tx}$ (FIG. 5) is shown in FIG. 7. The measured signal $V_{tx}$ contains interference caused by line reflections (e.g., echoes). The reflections are caused by impedance discontinuity due to impedance mismatch between different cables. For example, a large reflection pulse at 60 ns as shown in FIG. 7 corresponds to a reflection from the impedance discontinuity at an adapter connecting a 5 m patch cord to a 100 m cable. The magnitude of the echoes can be significant when compared to the magnitude of the receive signal at a long line length, and therefore, echo cancellation, as provided by the NEXT cancellers 12-14 shown in FIG. 4, is employed.

A receive signal $V_{rcv}$ (e.g., a signal received from a far-end transceiver) is also measured across resistor $R_{tx}$, as shown in FIG. 5. Accordingly, the near end transmit signal ($I_{tx} R_{tx}$) is preferably canceled or reduced from the composite signal $V_{tx}$ in order to effectively recover the far-end received signal $V_{rcv}$. This type of active cancellation can be accomplished with a replica transmit signal $V_{txr}$. Accordingly, a replica transmitter 2 (to be described below) is provided to generate a signal $V_{txr}$ to be subtracted from the measured signal $V_{tx}$, thus, effectively reducing the transmit signal ($I_{tx} R_{tx}$).

A receive signal x(t) transmitted with pulse amplitude modulation ("PAM") is define by:

$$x(t) = \sum_{n=1}^{\infty} a \cdot p(t - nT), \quad (7)$$

where $a_n$ is the transmit symbols and p(t) is the channel pulse derived by convoluting an impulse transmit pulse with a channel response defined by Equation 5. The receive signal for a 100 m cable is heavily attenuated by the transmission line and the pulse width is dispersed, as shown in FIG. 9. A 100 m UTP delays the signal by about 550 ns. Signal equalization preferably uses high frequency boosting via the FIR 16 to remove precursor intersymbol interference ("ISI") and to insert a zero crossing for timing recovery 21. The DFE 17 is used to remove postcursor ISI.

The receive signal's elongated tail results from transformer coupling (e.g., a high-pass filter) with a time constant (e.g., L/R) typically on the order of microseconds. Since the receive signal contains little or no average DC energy, the negative tail has the same amount of energy as the positive pulse. In this regard, the signal's area integral is zero. In a typical example, a tail can last over 10 µs with a magnitude of no more than 0.5 mV. The long tail causes any DC bias to drift back toward zero, which can lead to baseline wander. As will be appreciated, this response time is too long to be practically removed by a digital equalizer, but the response is slow enough to be cancelled using a slow integrator, for example. The baseline wander canceller 4 is preferably decision directed to minimize the error defined by the difference between the equalized value and it's sliced value, as discussed below.

As illustrated in FIG. 8, the replica transmitter 2 includes a current source $I_{txr}$. $I_{txr}$ is coupled to a voltage V through resistors R, as shown in FIG. 8. In a preferred embodiment, R is 100 ohms and V is about 2.5 volts. The replica signal $V_{txr}$ is preferably filtered through a known low-pass filter to obtain a low-pass replica signal ("$V_{txrl}$") as shown in FIG. 10. Replica signal $V_{txr}$ can also be inverted in a known manner to produce $-V_{txr}$. The preferred performance specifications for the transmitter 1 and replica transmitter 2 are shown in Table 1.

TABLE 1

Transmitter and Replica Performance Specifications

| Parameters | Specifications |
| --- | --- |
| Transmit Current | +/−40 mA |
| Replica Transmit Current | ¼ of transmit current |
| Number of levels | 16 (not including 0) |
| Number of sub-units | 8 (sequentially delayed) |
| Transmit Profile | [1 1 2 2 1 1], w/~1 ns delay |
| Replica Transmit Profile | [1 1 3 3], w/~1 ns delay |
| $R_{tx}$ | 100Ω |

A transmit signal canceller 4 is illustrated in FIG. 11. The transmit canceller 4 removes the transmission signal ($I_{tx} R_{tx}$) from the measured (or detected) transmit $V_{tx}$ signal. In particular, the transmit canceller includes an active resistive summer that provides a large input dynamic range and stable linearity characteristics, while removing (e.g., reducing or canceling) the unwanted transmit signal component.

As illustrated in FIG. 11, the active summer includes an operational amplifier ("op-amp") with inverting feedback. The op-amp is preferably constructed using integrated circuits in a known manner. The summer receives $V_{txrl}$, $V_{tx}$, $-V_{txr}$, $I_{cms}$, and $I_{bl}$ as input signals. $I_{bl}$ is a baseline wander control current, and $I_{cms}$ is a common-mode shift current, each as further discussed below.

As will be appreciated by those skilled in the art, a transformer typically has high-pass characteristics. Accordingly, replica signal $-V_{txr}$ is combined (e.g., subtracted via the active resistive summer) with the low pass replica signal $V_{txrl}$ to produce a high-pass replica signal. As an alternative configuration, $V_{txr}$ could be filtered through a known high-pass filter prior to the transmit canceller 3 stage.

Returning to FIG. 11, receive signal $V_{rcv}$ is determined from the following relationships.

Let:

Vi=voltage for the op-amp's positive terminal;

$V_1 = V_{txrl}$;

$V_2 = V_{tx}$;

$-V_3 = -V_{txr}$;

$i_4 = I_{cms}$; and $i_5 = I_{bl}$.

Then:

$$i_1 + i_2 - i_3 - i_4 - i_5 = i_0; \text{ and} \quad (i)$$

$$\frac{V_1 - V_i}{R_1} = i_1; \frac{V_2 - V_i}{R_1} = i_2; \frac{V_i - -V_3}{R_1} = i_3; \frac{V_i - V_{rcv}}{R_r} = i_0. \quad (ii)$$

$$\Rightarrow \frac{V_1 - V_i}{R_1} + \frac{V_2 - V_i}{R_1} - \frac{V_i - V_3}{R_1} - i_4 - i_3 = \frac{V_i - V_{rcv}}{R_r}$$

$$\Rightarrow \frac{V_1 + V_2 - V_3 - 3V_i}{R_1} - i_1 - i_s = \frac{V_i - V_{rcv}}{R_r}$$

$$\Rightarrow \frac{R_r}{R_1}(V_1 + V_2 - V_3 - 3V_i) - i_4 \cdot R_r - i_3 \cdot R_r = V_i - V_{rcv}$$

$$\Rightarrow \frac{R_r}{R_1}(V_1 + V_2 - V_3 - 3v_i) - R_r i_a - R_r i_2 - V_i = -V_{rcv}$$

$$V_{rcv} = v_1 - \frac{R_r}{R_1}(V_1 + V_2 - V_3 - 3V_i) + R_r(i_4 + i_5) \quad (8)$$

Substituting the input signals for their placeholders yields the definition for $V_{rcv}$, as follows:

$$V_{rcv} = V_i - \frac{R_r}{R_1}(V_{txrl} + V_{tx} - V_{txr} - 3V_i) + R_r(I_{cms} + I_{bl}). \quad (9)$$

The gain is preferably set between 0.75 and 1 (e.g., $R_F/R_1$ equals 0.75 to 1). For a small signal analysis, Vi can be set to zero (0). Also, as will be appreciated by those skilled in the art, in a fully differential circuit, Vi effectively drops out of the equations since $V_{rcv} = V_{rcv}^{(+)} - V_{rcv}^{(-)}$. As discussed, $V_{txrl}$ and $-V_{txr}$ are combined through the active summer to provide a high-pass replica signal ("$V_{txrh}$"). The receive signal $V_{rcv}$ can then be recovered as shown by Equation 9.

Preferred transmit canceller specifications are detailed in Table 2, below.

TABLE 2

Transmit Canceller Performance Specifications

| Parameters | Specifications |
|---|---|
| Input Dynamic Range | +/−2.5 V(diff.) for transmit signal |
| Output Dynamic Range | +/−1 V(diff.) |
| Input impedance | High, ~10 k. |
| Output impedance | Low |
| Cutoff frequency | Greater than 31.5 Mhz |
| DC Gain | 0.85-dependent on the LPF 5 and ADC 6 characteristics (FIG. 4) |
| Power | 25 mw, including LPF 5 (FIG. 4) |
| $R_f$ | 8.5 KΩ; or 7.5 KΩ for increased attenuation |
| Vi | 2.0 volts |
| $R_i$ | 10 KΩ |

A known current mode circuit, e.g., a voltage controlled current source (VCCS) as shown in FIG. 14, with feedback preferably sets the summer input current-mode voltage ($V_{cm}$). Of course, other known current mode circuits could be employed with the present invention. This current-mode circuit shifts the common-mode of both the transmit and replica transmit signals. The input to the op amp ($V_{aip}$, $V_{ain}$) is compared against the desired op amp output common-mode voltage ($V_d$):

$$V_d = (V_{aip} - V_{cm}) + (V_{ain} - V_{cm}) \quad (10)$$

Then, the common-mode shift current can be determined from:

$$I_{cms} = V_d g_m + I_0, \quad (11)$$

where $g_m$ is a transconductance and $I_o$ is an offset current. An appropriate transconductance and offset current can be selected by setting $V_{cm} = I_{cms}R_F = V_d g_m R_F + I_0 R_F$, to ensure a proper common-mode voltage seen by the op amp inputs. In this manner, the common mode shift current $I_{cms}$ can be regulated to pull down the common mode voltage of the operational amplifier as needed.

Baseline wander current $I_{bl}$ is also "summed" by the active resistive summer, as shown in FIG. 11, to correct baseline wander. Approximately ninety percent (90%) of all system baseline correction can be obtained through the active summer. The remaining baseline residual can be digitally corrected through an equalizer, for example. As will be appreciated, the FIG. 11 topology allows the current sources ($I_{bl}$ and $I_{cme}$) to each have a fixed output voltage, thus, minimizing current deviation due to finite output resistance.

The baseline wander correction module 4 preferably corrects for baseline wander using a decision-directed method, such as a discrete integrator. The decision-directed method can be implemented with a known charge pump, where the pump sign (e.g., +1/−1) is determined digitally using an error between the equalized baseline signal ($y_k$) and a sliced baseline signal ($y_k$), as shown in FIG. 12. As will be appreciated by those skilled in the art, the expected error value (e.g., $E[e_k]$) is ideally driven to zero. The charge pump is preferably pumped up or down based on the error value. For example, a positive error implies that a negative value should be input into the charge pump. For a negative error, a positive value should be input into the charge pump. The charge pump preferably has at least two current settings to regulate $I_{bl}$. Of course, a charge pump with many current settings could be used to obtain finer baseline correction control.

The preferred baseline wander correction performance specifications are further detailed in Table 3, below.

TABLE 3

Baseline Wander Correction Specification

| Parameters | Specifications |
|---|---|
| Output Dynamic Range | +/−100 uA (diff.), (+/−1 V/$R_1$, $R_1$ = 10 kΩ) |
| Output impedance | High |
| Integration Factors | 2 mV/T, 4 mV/T |
| Bandwidth | >100 MHz |

A second-order low-pass filter, as shown in FIG. 13, is cascaded after the summer to preferably flatten the frequency response out to about 31.25 MHz (<1 dB). A minimum overall attenuation of 20 dB at 125 MHz is desirable for the low pass filter. In a sampled system, some aliasing beyond Nyquist frequency (or excess bandwidth) is acceptable, but minimum aliasing is allowed at the sampling frequency. The transmitted data is preferably band-limited to the Nyquist rate.

Preferred performance characteristics of the low pass filter 5 are further detailed in Table 4, below.

TABLE 4

LPF Performance Specification

| Parameters | Specifications |
|---|---|
| Input Dynamic Range | +/−1 V(diff.) |
| Output Dynamic Range | +/−1 V(diff.) |
| Input impedance | High, ~10 k. |
| Output impedance | Low |
| Cutoff frequency | 50-60 Mhz. |
| Q (2nd order) | ~1 |
| Input impedance | High, ~10 k. |
| Output impedance | Low, <100 |
| DC gain | 1 |

As an alternative arrangement, a third-order Sallen and Key low pass filter as disclosed in a co-pending application by the same inventor of this application, titled "CALIBRATION CIRCUIT," filed concurrently herewith, and hereby incorporated by reference, could be used as filter 5. Similarly, the calibration circuit disclosed therein could also be used to calibrate the low pass filter 5.

Analog-to-digital converters are well know in the art. As will be appreciated, the ADC 6 resolution is often determined by system digital processing requirements. In a preferred embodiment, the Viterbi detector 18 requires an effective 7-bit resolution. Residual baseline wander, echoes, and crosstalk increase the dynamic range by about 200-300 mV, which increases the required resolution. The reduction in dynamic range due to insertion loss for a 100 m cable is approximately 40%. Accordingly, an 8-bit resolution is preferred.

The preferred ADC performance specifications are further detailed in Table 5, below.

TABLE 5

ADC Performance Specification

| Parameters | Specifications |
|---|---|
| Resolution | 8-bits minimum. |
| Sampling frequency | 125 MS/s |
| Source Output Impedance | Low, ~200-400Ω |

Thus, a transmit canceller including an active resistive summer has been described. Such an active resistive summer has not heretofore been developed for applications such as canceling signals in gigabit channels. Correcting baseline wander through such an active resistive summer has also been described herein.

While the present invention has been described with respect to what is presently considered to be the preferred embodiments, it will be understood that the invention is not limited to the disclosed embodiments. To the contrary, the invention covers various modifications and equivalent arrangements included within the spirit and scope of the appended claims. The scope of the following claims is to be accorded the broadest interpretation so as to encompass all such modifications and equivalent structures and functions.

For example, while preferred circuit configurations and component values have been described, it will be understood that modifications could be made without deviating from the inventive structures. For example, values for the feedback and input resistors $R_f$ and $R_1$ could be changed to obtain higher or lower gains. Also, an active resistive summer could be constructed to sum only the measured signal $V_{tx}$ and the replica signal $V_{rxr}$ (or a high-pass version of the replica), for example. Additionally, while the communication channel has been described with respect to a twisted pair of cables, the invention may also be practiced with other communication channels such as optical and wireless channels. Moreover, this invention should not be limited to gigabit transmission rates and can be practiced at any transmission rate requiring the signal processing characteristics of the invention. Of course, these and other such modifications are covered by the present invention.

What is claimed is:

1. A communication system including a first transmission channel with a first end and a second end, the first end coupled to a first transformer and the second end coupled to a second transformer, a first end transceiver transmitting and receiving signals via the first transformer and a second end transceiver transmitting and receiving signals via the second transformer, a first signal being supplied at the first end, the first signal comprising a transmission signal component of the first transceiver and a receive signal component from the second transceiver, said communication system comprising:

a replica transmitter that generates a replica of the transmission signal component of the first transceiver;

a filter to filter the replica signal; and an active resistive summer receiving the first signal and the filtered replica signal as inputs to reduce the transmission signal component at an output of the active resistive summer, wherein said active resistive summer includes an operational amplifier having a first polarity input terminal, a second polarity input terminal, and an output terminal, said active resistive summer further comprising:

a feedback element in communication with the output terminal and the second polarity input terminal;

a first resistor in communication with the second polarity input terminal and the first signal; and a second resistor in communication with the second polarity input terminal and the filtered replica signal.

2. The communication system according to claim 1, wherein said active resistive summer includes an operational amplifier.

3. The communication system according to claim 1, wherein the active resistive summer receives an inverted replica signal as an input, and wherein a third resistor is in communication with the inverted replica signal and the second polarity input terminal.

4. The communication system according to claim 3, wherein the active resistive summer includes an input for baseline correction current.

5. The communication system according to claim 4, further comprising a charge pump that controls the current for the baseline current.

6. The communication system according to claim 5, wherein the charge pump controls current based on a digital error between an equalized baseline signal and a sliced baseline signal.

7. The communication system according to claim 4, wherein the active resistive summer includes an input for common-mode shift current.

8. A communication system including a first transmission channel with a first end and a second end, the first end coupled to a first transformer and the second end coupled to a second transformer, a first end transceiver transmitting and receiving signals via the first transformer and a second end transceiver transmitting and receiving signals via the second transformer, a first signal being supplied at the first end, the first signal comprising a transmission signal component of the first transceiver and a receive signal component of the second transceiver, said communication system comprising:
- means for replicating the transmission signal component of the first transceiver;
- means for filtering an output of the replicating means; and
- means for summing the first signal and an output of the filtering means to reduce the transmission signal at an output of the summing means, wherein said summing means includes means for amplifying having a first polarity input terminal, a second polarity input terminal, and an output terminal, said summing means further comprising:
  - feedback means for communicating between the output terminal and the second polarity input terminal;
  - first resistive means for communicating between the second polarity input terminal and the first signal; and
  - second resistive means for communicating between the second polarity input terminal and the filtered replica transmission signal component.

9. The communication system according to claim 8, wherein said summing means includes means for amplifying.

10. The communication system according to claim 8, wherein the summing means further sums an inverted replica transmission signal component, and
wherein a third resistor is in communication with the inverted replica transmission signal component and the second polarity input terminal.

11. The communication system according to claim 10, wherein the summing means includes means for receiving a baseline correction current.

12. The communication system according to claim 11, further comprising means for controlling the current for the baseline current.

13. The communication system according to claim 12, wherein the pumping means controls current based on a digital error between an equalized baseline signal and a sliced baseline signal.

14. The communication system according to claim 11, wherein the communication system includes means for controlling common-mode voltage.

15. A method in a communication system including a first transmission channel with a first end and a second end, the first end coupled to a first transformer and the second end coupled to a second transformer, a first end transceiver transmitting and receiving signals via the first transformer and a second end transceiver transmitting and receiving signals via the second transformer, a first signal being supplied at the first end, the first signal comprising a transmission signal component of the first transceiver and a receive signal component of the second transceiver, said method comprising the steps of:
- generating a replica of the transmission signal component of the first transceiver;
- filtering the replica signal; and
- summing with an active resistive summer the first signal and the replica signal to reduce the transmission signal at an output of the active resistive summer, wherein the active resistive summer includes an operational amplifier having a first polarity input terminal, a second polarity input terminal, and an output terminal, said active resistive summer further comprising:
  - a feedback element in communication with the output terminal and the second polarity input terminal;
  - a first resistor in communication with the second polarity input terminal and the first signal; and
  - a second resistor in communication with the second polarity input terminal and the filtered replica transmission signal.

16. The method according to claim 15, wherein the active resistive summer includes an operational amplifier.

17. The method according to claim 15, wherein the active resistive summer sums an inverted replica transmission signal component, and
wherein the third resistor is in communication with the inverted replica transmission signal component and the second polarity input terminal.

18. The method according to claim 17, further comprising the step of inputting baseline correction current into the active resistive summer.

19. The method according to claim 18, further comprising a step of controlling the baseline current with a charge pump.

20. The method according to claim 19, wherein the charge pump controls current based on an error between an equalized baseline signal and a sliced baseline signal.

21. The method according to claim 18, further comprising the step of inputting a common-mode shift current into the active resistive summer to control a common-mode voltage of the operational amplifier.

22. An electrical circuit in a communications channel comprising:
- an active resistive summer,
  - wherein the active resistive summer comprises an operational amplifier with an inverting feedback, and
  - wherein the active resistive summer further comprises:
    - an input for a composite signal, the composite signal including a transmission signal component and a receive signal component;
    - an input for a replica transmission signal; and
    - an output for a receive signal which comprises the composite signal minus the replica signal,
    - wherein the operational amplifier includes a first polarity input terminal, a second polarity input terminal, and an output terminal, and
  - wherein the active resistive summer further comprises:
    - a feedback element in communication with the output terminal and the second polarity input terminal;
    - a first resistor in communication with the second polarity input terminal and the composite signal; and
    - a second resistor in communication with the second polarity input terminal and the replica transmission signal.

23. The electrical circuit according to claim 22, wherein the replica transmission signal comprises a high pass signal.

24. The electrical circuit according to claim 22, wherein the replica transmission signal comprises a negative replica transmission signal as a first signal and a low pass replica transmission signal as a second signal,
wherein the second resistor comprises a third resistor and a fourth resistor, and
wherein the third resistor is in communication with the first signal and the second polarity input terminal and the fourth resistor is in communication with the second signal and the second polarity input terminal.

25. The electrical circuit according to claim 22, wherein the active resistive summer further comprises an input for receiving a current for baseline correction.

26. The electrical circuit according to claim 25, further comprising a charge pump to control the current for the baseline current.

27. The electrical circuit according to claim 26, wherein the charge pump controls current based on an error between an equalized baseline signal and a sliced baseline signal.

28. The electrical circuit according to claim 25, wherein the active resistive summer further comprises an input to receive a common-mode shift current.

29. An electrical circuit in a communications channel comprising:
   means for summing,
      wherein the summing means comprises means for amplifying with means for inverting feedback, and
      wherein the summing means further comprises:
         means for inputting a composite signal, the composite signal including a transmission signal component and a receive signal component;
         means for inputting a replica transmission signal; and
         means for outputting a receive signal which comprises the composite signal minus the replica signal,
         wherein the means for amplifying including a first polarity input terminal, a second polarity input terminal, and an output terminal, and
      wherein the summing means further comprises:
         feedback means for communicating with the output terminal and the second polarity input terminal;
         first resistive means for communicating with the second polarity input terminal and the composite signal; and
         second resistive means for communicating with the second polarity input terminal and the replica transmission signal.

30. The electrical circuit according to claim 29, wherein the replica transmission signal comprises a high pass signal.

31. The electrical circuit according to claim 29, wherein the replica transmission signal comprises a negative replica transmission signal as a first signal and a low pass replica transmission signal as a second signal,
   wherein the second resistive means comprises a third resistive means and a fourth resistive means, and
   wherein the third resistive means is for communicating with the first signal and the second polarity input terminal and the fourth resistive means is for communicating with the second signal and the second polarity input terminal.

32. The electrical circuit according to claim 29, wherein the summing means further comprises means for receiving a current for baseline correction.

33. The electrical circuit according to claim 32, further comprising means for pumping to control the current for the baseline current.

34. The electrical circuit according to claim 33, wherein the pumping means controls current based on an error between an equalized baseline signal and a sliced baseline signal.

35. The electrical circuit according to claim 32, wherein the summing means further comprises means for receiving a common-mode shift current.

36. A method of reducing a transmission signal from a composite signal in a communications channel, comprising the steps of:
   inputting the composite signal into an active resistive summer, the composite signal including the transmission signal component and a receive signal component,
      wherein the active resistive summer includes an operational amplifier with inverting feedback;
   inputting a replica transmission signal into the active resistive summer; and
   outputting a signal from the active resistive summer which comprises the composite signal minus the replica transmission signal,
      wherein the operational amplifier includes a first polarity input terminal, a second polarity input terminal, and an output terminal, and
   wherein the active resistive summer further includes:
      a feedback element in communication with the output terminal and the second polarity input terminal;
      a first resistor in communication with the second polarity input terminal and the composite signal; and
      a second resistor in communication with the second polarity input terminal and the replica transmission signal.

37. The method according to claim 36, wherein the replica transmission signal comprises a high pass signal.

38. The method according to claim 36, wherein the replica transmission signal comprises a negative replica transmission signal as a first signal and a low pass replica transmission signal as a second signal, and
   wherein the second resistor comprises a third resistor and a fourth resistor, and
   wherein the third resistor is in communication with the first signal and the second polarity input terminal and the fourth resistor is in communication with the second signal and the second polarity input terminal.

39. The method according to claim 38, further comprising the step of inputting a current into the active resistive summer to correct baseline wander.

40. The method according to claim 39, further comprising the step of controlling the current for correcting the baseline wander with a charge pump.

41. The method according to claim 40, wherein the charge pump controls current based on an error between an equalized baseline signal and a sliced baseline signal.

42. The method according to claim 39, further comprising the step of inputting a common-mode shift current into the active resistive summer.

* * * * *

UNITED STATES PATENT AND TRADEMARK OFFICE
CERTIFICATE OF CORRECTION

PATENT NO. : 7,466,971 B1 Page 1 of 1
APPLICATION NO. : 10/786010
DATED : December 16, 2008
INVENTOR(S) : Pierte Roo It is certified that error appears in the above-identified patent and that said Letters Patent is hereby corrected as shown below:

Title Page [*]   Insert -- Terminal Disclaimer filed August 25, 2006 --
Column 1, Line 9   Delete "now U.S. Pat. No. 6,775,529" This is a duplicate
Column 4, Line 11   Delete "crosswalk" and insert -- crosstalk --
Column 5, Line 49   Delete "define" and insert -- defined --

Signed and Sealed this

Twenty-fourth Day of November, 2009

David J. Kappos
*Director of the United States Patent and Trademark Office*